(12) United States Patent
Shido et al.

(10) Patent No.: US 10,462,858 B2
(45) Date of Patent: Oct. 29, 2019

(54) VEHICLE LAMP

(71) Applicant: Koito Manufacturing Co., Ltd, Tokyo (JP)

(72) Inventors: Masaya Shido, Shizuoka (JP); Yukihiro Onoda, Shizuoka (JP); Toru Ito, Shizuoka (JP); Yoshiro Ito, Shizuoka (JP); Haruhiko Iyoda, Shizuoka (JP); Hironori Tsukamoto, Shizuoka (JP)

(73) Assignee: KOITO MANUFACTURING CO., LTD., Minato-Ku, Tokyo (JP)

(*) Notice: Subject to any disclaimer, the term of this patent is extended or adjusted under 35 U.S.C. 154(b) by 0 days.

(21) Appl. No.: 15/977,800

(22) Filed: May 11, 2018

(65) Prior Publication Data

US 2018/0270921 A1    Sep. 20, 2018

Related U.S. Application Data

(60) Division of application No. 15/175,617, filed on Jun. 7, 2016, now abandoned, which is a continuation of
(Continued)

(30) Foreign Application Priority Data

Dec. 25, 2013   (JP) ................................ 2013-267689
Feb. 5, 2014    (JP) ................................ 2014-020576
(Continued)

(51) Int. Cl.
*H05B 33/08*       (2006.01)
*B60Q 1/04*        (2006.01)
(Continued)

(52) U.S. Cl.
CPC ........... *H05B 33/08* (2013.01); *B60Q 1/0483* (2013.01); *F21S 43/145* (2018.01); *F21S 43/195* (2018.01);
(Continued)

(58) Field of Classification Search
CPC ........ H05B 33/08; H05B 33/06; H05B 33/14; H05B 33/24; F21S 43/145; F21S 45/10; F21S 43/195; B60Q 1/0483
(Continued)

(56) References Cited

U.S. PATENT DOCUMENTS

2011/0280045 A1    11/2011   Baek

FOREIGN PATENT DOCUMENTS

EP    0933589 A2    8/1999
EP    2221531 A2    8/2010
(Continued)

OTHER PUBLICATIONS

JP 2013 065523 Machine Translation (Year: 2013).*
(Continued)

*Primary Examiner* — Daniel A Hess
(74) *Attorney, Agent, or Firm* — Buchanan Ingersoll & Rooney PC

(57) ABSTRACT

A vehicle lamp includes a planar light-emitting structure having a substrate on which an organic EL emission element is provided, a framing member that fixes the planar light-emitting structure inside a vehicle-lamp light cabinet, and an elastic member that is interposed between the planar light-emitting structure and the framing member and that fixes the planar light-emitting structure by its biasing force.

8 Claims, 23 Drawing Sheets

Related U.S. Application Data application No. PCT/JP2014/083879, filed on Dec. 22, 2014.

(30) Foreign Application Priority Data

Feb. 12, 2014 (JP) ................................ 2014-024494
Sep. 30, 2014 (JP) ................................ 2014-199841

(51) Int. Cl.
  *H05B 33/06* (2006.01)
  *H05B 33/14* (2006.01)
  *H05B 33/24* (2006.01)
  *F21S 43/19* (2018.01)
  *F21S 43/145* (2018.01)
  *F21S 45/10* (2018.01)
  *F21Y 115/15* (2016.01)
  *F21S 45/47* (2018.01)
  *F21S 45/37* (2018.01)

(52) U.S. Cl.
  CPC ............ *F21S 45/10* (2018.01); *H05B 33/06* (2013.01); *H05B 33/14* (2013.01); *H05B 33/24* (2013.01); *F21S 45/37* (2018.01); *F21S 45/47* (2018.01); *F21Y 2115/15* (2016.08); *H01L 2251/5361* (2013.01)

(58) Field of Classification Search
  USPC ......................................................... 362/549
  See application file for complete search history.

(56) References Cited

FOREIGN PATENT DOCUMENTS

| EP | 2592331 A1 | | 5/2013 |
|---|---|---|---|
| JP | 2001 093662 | * | 4/2001 |
| JP | 2009129700 A | | 6/2009 |
| JP | 2010 146821 | * | 7/2010 |
| JP | 2010192819 A | | 9/2010 |
| JP | 5020113 B2 | | 9/2012 |
| JP | 2013 065523 | * | 4/2013 |
| JP | 5227773 B2 | | 7/2013 |
| WO | 2013147010 A1 | | 10/2013 |

OTHER PUBLICATIONS

Official Action on related JP patent application No. 2015-554874, dated Sep. 4, 2018.
Official Action on related CN patent application No. 201480067199.8, dated Sep. 7, 2018.
Communication pursuant to Article 94(3) EPC for corresponding European Patent Application No. 14874435.2, dated Jul. 20, 2018.
Extended European Search Report for corresponding European Patent Application No. 18168905.0, dated Jul. 25, 2018.

* cited by examiner

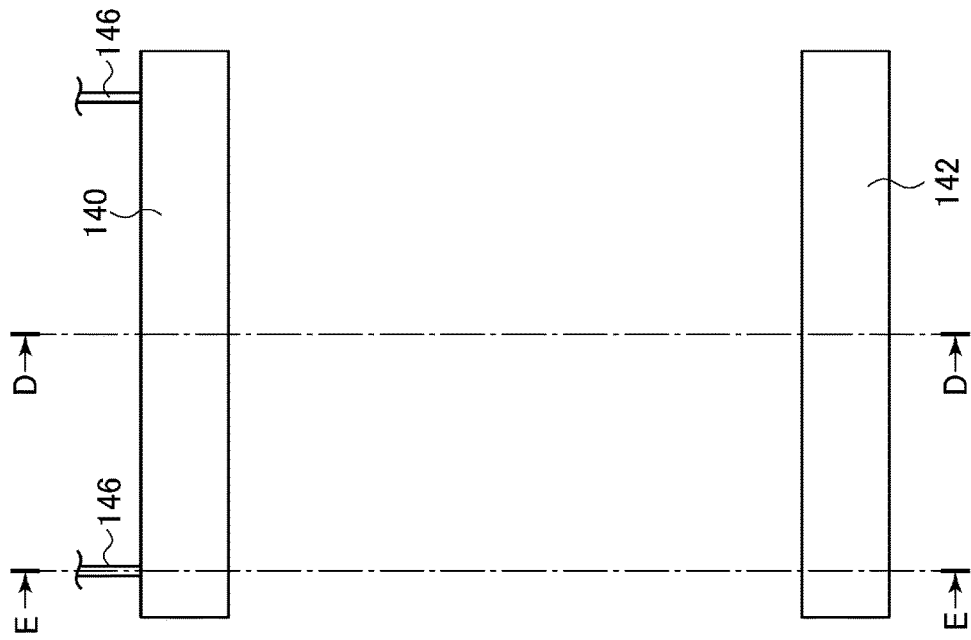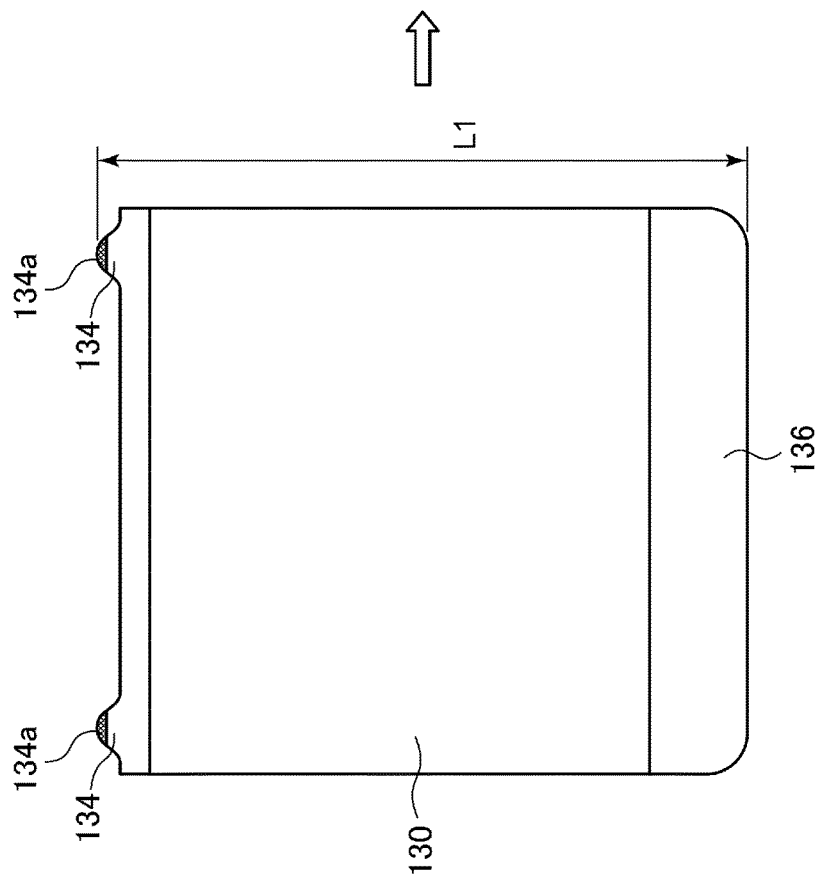

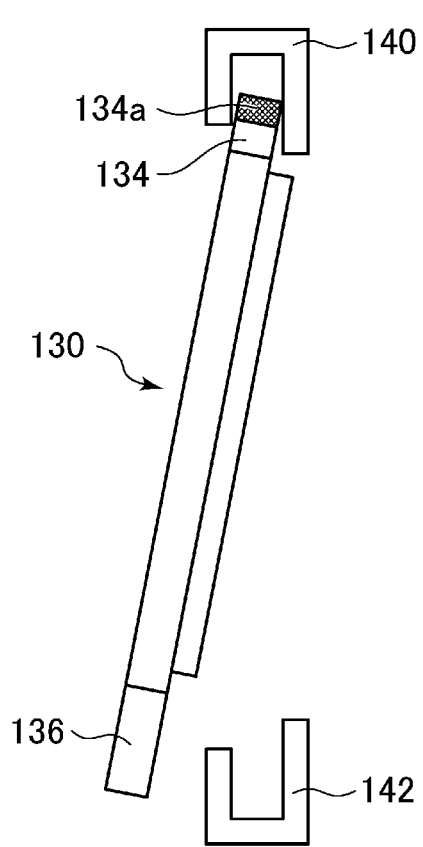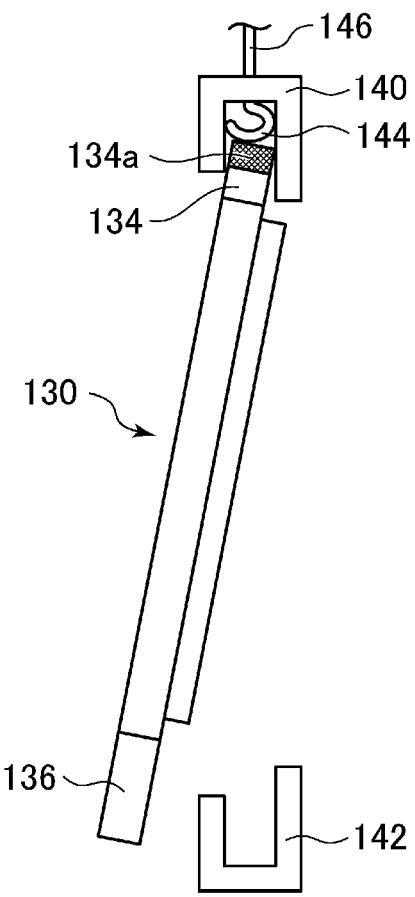

FIG. 16A
FIG. 16B
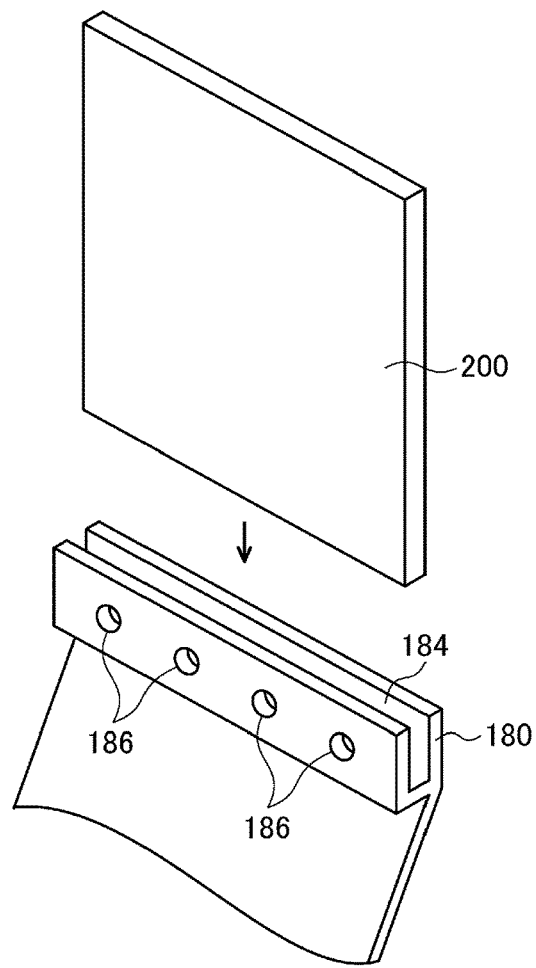
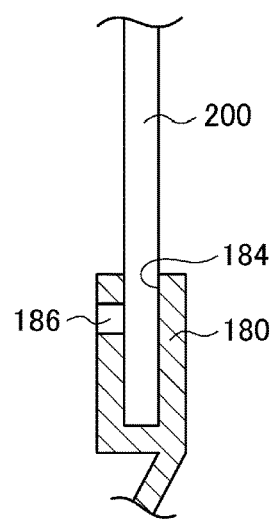
FIG. 16C
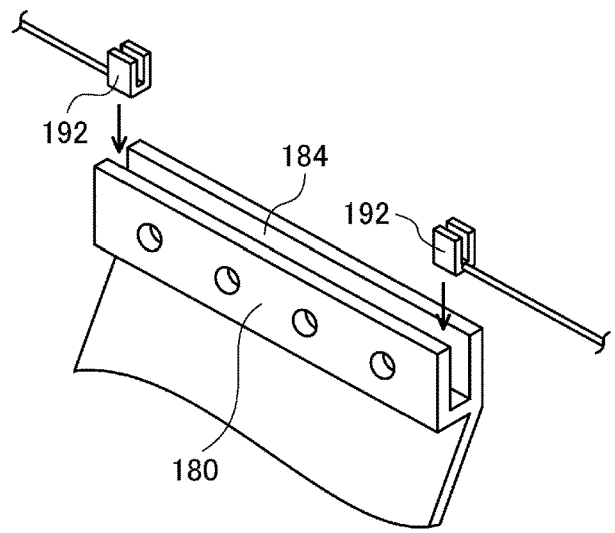

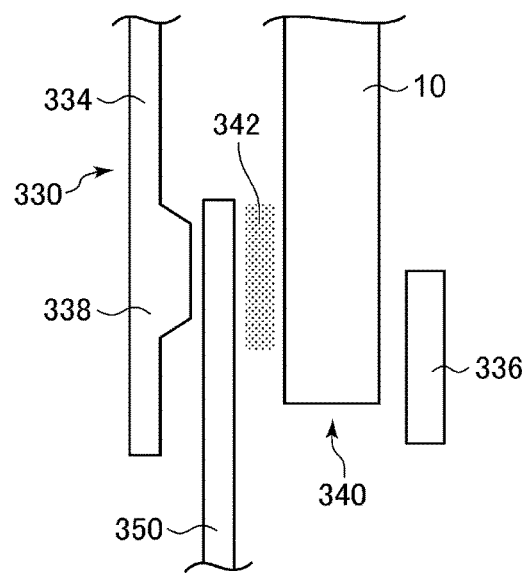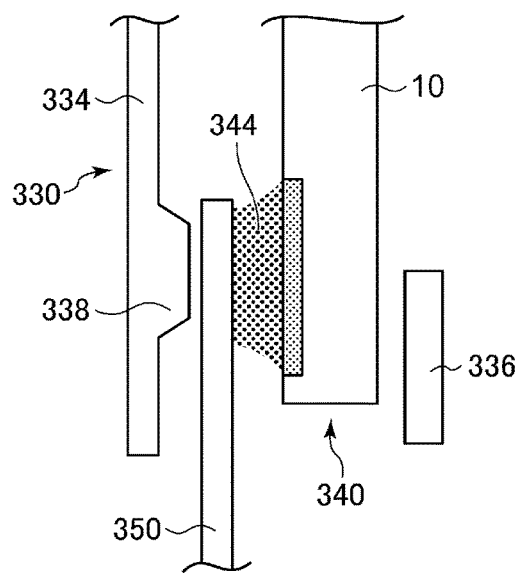

VEHICLE LAMP

CROSS-REFERENCE TO RELATED APPLICATIONS

This application is based upon and claims the benefit of priority from prior Japanese Patent Application No. 2013-267689, filed on Dec. 25, 2013, Japanese Patent Application No. 2014-020576, filed on Feb. 5, 2014, Japanese Patent Application No. 2014-024494, filed on Feb. 12, 2014, Japanese Patent Application No. 2014-199841, filed on Sep. 30, 2014, and International Patent Application No. PCT/JP2014/083879, filed on Dec. 22, 2014 and U.S. patent application Ser. No. 15/175,617, filed Jun. 7, 2016, the entire content of each of which is incorporated herein by reference.

BACKGROUND

1. Field

The present invention relates to vehicle lamps including planar light-emitting structures.

2. Description of the Related Art

Vehicle lamps in which planar light-emitting structures, such as organic EL panels, are used as light sources are known. Japanese Patent Application Publication No. 2013-45523 discloses a technique for anchoring a planar light-emitting structure by fitting it into a bracket (bezel) in the form of a frame shaped to fit the outer peripheral geometry of the planar light-emitting structure.

Currently, glass substrates are often used as substrates for organic EL panels. Consequently, vehicular implementations in which the organic EL panel is anchored by, for example, being tightened down with screws risk damaging the substrate by the great stress that vehicular vibrations produce in the substrate.

SUMMARY

The present invention has been made to address such issues, and is directed to providing a fixing technique by which stress exerted on a substrate for a planar light-emitting structure is reduced in a vehicle lamp provided with a planar light-emitting structure.

A vehicle lamp according to an aspect of the present invention includes a planar light-emitting structure having a substrate on which an organic EL emission portion is provided, a framing member that fixes the planar light-emitting structure inside a vehicle-lamp light cabinet, and an elastic member that is interposed between the planar light-emitting structure and the framing member, where the elastic member fixes the planar light-emitting structure by its biasing force.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 7A is a plan view of an organic EL panel according to another embodiment of the present invention, and FIG. 7B is a plan view of brackets that fix the organic EL panel;

FIGS. 9A and 9B are sectional views illustrating a process of mounting the organic EL panel into the brackets;

FIG. 16A is a perspective view for describing a method of fixing an organic EL panel according to yet another example, FIG. 16B is a sectional view of a fixing member, and FIG. 16C illustrates an arrangement of electrical connection portions in the fixing member;

FIGS. 30A and 30B are enlarged views of a portion marked by K in FIG. 23B;

DETAILED DESCRIPTION OF THE INVENTION

Figure 1:
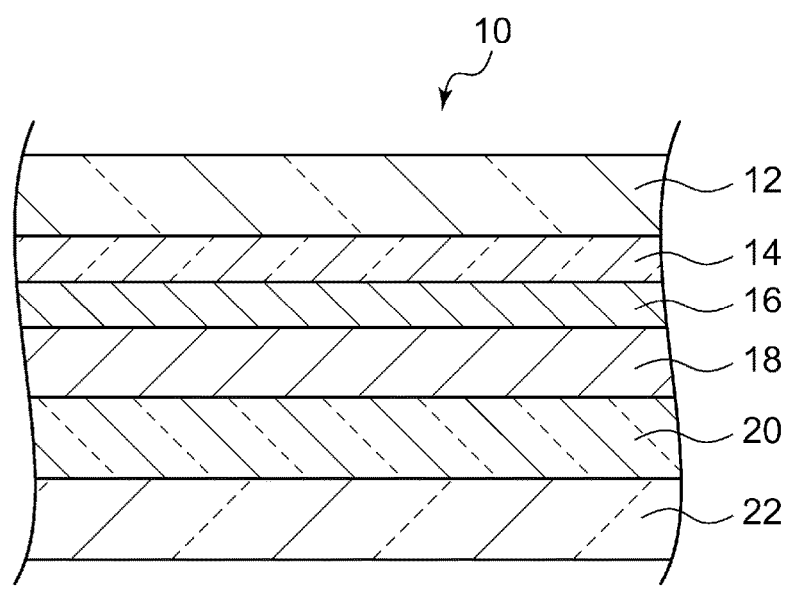
FIG. 1 is a sectional view illustrating a schematic configuration of an organic EL panel (planar light-emitting structure) to be used in each of the embodiments of the present invention.

FIG. 1 is a sectional view illustrating a schematic configuration of an organic EL panel (planar light-emitting structure) to be used in each of the embodiments of the present invention described hereinafter. An organic EL panel 10 has a structure in which an anode layer 14, which is a transparent conductive film (e.g., ITO), a micro-reflective metal layer 16, an organic EL emission layer 18, and a cathode layer 20, which is a rear-side conductive film, are stacked between a front glass substrate 12 and a rear glass substrate 22.

The stacked layers of the anode layer 14 through the cathode layer 20 may be formed by stacking these layers on the glass substrate 12 or by stacking these layers on the glass substrate 22. In other words, the organic EL emission layer 18, which is an organic EL emission portion, may be formed over the glass substrate 12, or the organic EL emission layer 18, which is the organic EL emission portion, may be formed over the glass substrate 22.

The micro-reflective metal layer 16 is disposed between the anode layer 14 and the organic EL emission layer 18, and thus a microcavity structure is formed. The distance between the micro-reflective metal layer 16 and the cathode layer 20 is selected in accordance with the wavelength of light emitted by the organic EL emission layer 18. With this microcavity structure, light emitted by the organic EL emission layer 18 is repeatedly reflected between the micro-reflective metal layer 16 and the cathode layer 20, and only a specific wavelength that resonates is amplified. Thus, the luminance of the emission portion can be increased. The organic EL panel 10 may be constituted without providing a micro-reflective metal layer between the anode layer 14 and the organic EL emission layer 18.

Embodiment 1

Figure 2D:
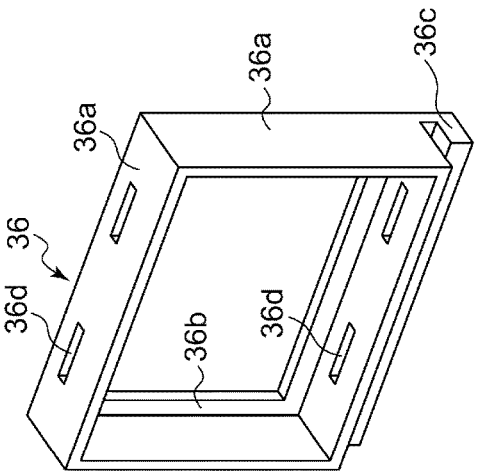
FIG. 2D is a perspective view of a framing member.
Figure 2C:
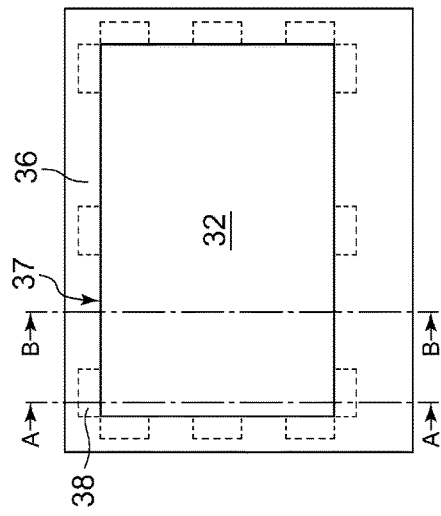
FIG. 2C is a front view of the light source unit.
Figure 2B:
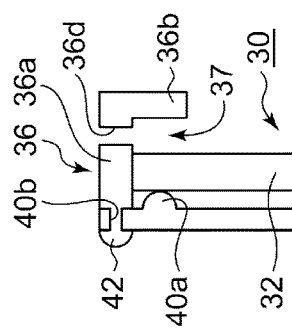
FIGS. 2A and 2B are schematic sectional views of a light source unit that includes an organic EL panel in a vehicle lamp according to an embodiment of the present invention.
Figure 2A:
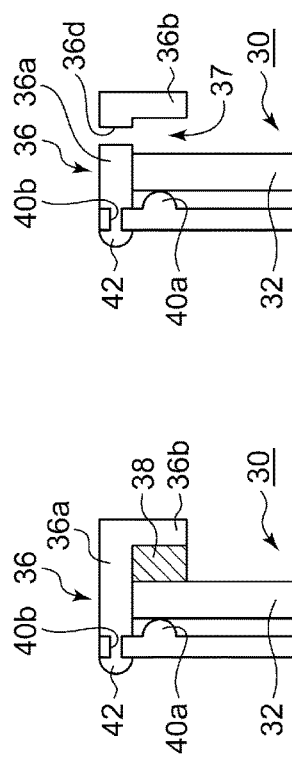

FIGS. 2A and 2B are schematic sectional views of a light source unit 30 that includes an organic EL panel in a vehicle lamp according to an embodiment of the present invention, taken along the line A-A and the line B-B, respectively, indicated in FIG. 2C; and FIG. 2C is a front view of the light source unit 30. The light source unit 30 is fixed to a housing 46 inside a lamp cabinet for a vehicle lamp (not illustrated). The light source unit 30 includes an organic EL panel 32 such as the one illustrated in FIG. 1, a framing member 36, and a rear cover 40.

The framing member 36 is configured to have the organic EL panel 32 fitted thereinto. The inner periphery of the framing member 36 is slightly larger than the outer periphery of the organic EL panel 32.

FIG. 2D is a rear perspective view of the framing member 36. As illustrated in FIG. 2D, the framing member 36 includes a peripheral wall 36a forming a rectangular enclosure and an extension portion 36b that extends from one end of the peripheral wall 36a toward the inner side. A tightening portion 36c that extends downwardly from the peripheral wall 36a and that is bent in an L-shape is formed on the lower side of the framing member 36. A bolt hole is formed in the tightening portion 36c, and the framing member 36 is fixed to the housing 46 of the vehicle lamp with a bolt 48. The tightening portion 36c may be provided on the upper side of the framing member 36 or may be provided on the right or left side of the framing member 36.

The rear cover 40 has a function of pressing the organic EL panel 32 against the framing member 36 from the back side. A convex portion 40a that abuts against the back surface of the panel 32 is provided on the rear cover 40 on a side that faces the organic EL panel 32. The convex portion 40a may be provided only on a peripheral portion of the panel, as illustrated in FIG. 2, or may be provided on another area.

A plurality of through-holes 40b are formed in the peripheral portion of the rear cover 40, and the rear cover 40 is fixed to the peripheral wall 36a of the framing member 36 by coupling portions 42. The coupling portions 42 may be formed through thermal caulking, welding, bonding, or the like. The rear cover 40 may be fixed by using a lance structure or another member, such as a screw, instead of by forming the coupling portions 42.

There is a conventional framing structure in which a peripheral portion of an organic EL panel 32 directly abuts against an extension portion 36b of a framing member 36. However, currently, a hard glass substrate is often used as a substrate for an organic EL panel. Thus, when the substrate directly abuts against the extension portion 36b of the framing member 36, great stress is exerted on the glass substrate, and the organic EL panel can be damaged due to the vibrations generated while the vehicle is running.

Accordingly, in the vehicle lamp according to the present embodiment, an elastic member 38 is interposed between a peripheral portion of the organic EL panel 32 on a side that faces the framing member 36 and the extension portion 36b of the framing member 36. The organic EL panel 32 is pressed by the biasing force of the elastic member 38 and is thus fixed to the framing member. With this configuration, the elastic member functions as a buffer material, and the stress exerted on the substrate for the organic EL panel while the vehicle is running can be reduced.

Desirably, a plurality of elastic members 38 are disposed at appropriate intervals, as illustrated in FIG. 2C, instead of providing an elastic member 38 across the entire peripheral portion of the organic EL panel 32. A reason for this is as follows. When an elastic member is present across the entire periphery of an organic EL panel, stress exerted on the substrate for the organic EL panel cannot be released, and the substrate can thus be easily damaged due to the increased stress. Disposing the elastic members in a manner illustrated in FIG. 2C can provide some play for the organic EL panel to move, which can further reduce the stress exerted on the substrate for the organic EL panel.

In addition, when the elastic members 38 are disposed so as to be spaced apart from each other, a penetrating space 37 can be formed between the organic EL panel 32 and the framing member 36, and the air whose temperature has risen by heat emitted from the organic EL panel when electricity is passed to the organic EL panel can pass through the penetrating space 37. In this case, a vent hole 36d for allowing the air to pass therethrough is formed in the peripheral wall 36a of the framing member 36 at a portion where no elastic member 38 is disposed. With this configuration, a convection current of the air is produced as the air whose temperature has risen by heat emitted from the organic EL panel passes through the penetrating space 37 and the vent hole 36d. Thus, the heat dissipation of the organic EL panel is facilitated, which contributes to an extended lifetime and increased efficiency of the panel.

When the organic EL panel 32 is to be disposed to stand vertically, the elastic members 38 may be disposed such that the penetrating space 37 extends in the vertical direction. When the organic EL panel 32 is to be disposed at an angle to the vertical direction, the elastic members 38 may be disposed such that the penetrating space 37 extends in a direction substantially parallel to a longitudinal side of the organic EL panel 32.

The elastic members may, for example, be made of an elastomer or a gel material. An elastic member made of an elastomer may be cut into pieces of an appropriate size in advance, and the pieces may be bonded to the extension portion 36b of the framing member 36 before an organic EL panel is fitted into the framing member 36. The mounting surface of the elastomer and the mounting surface of the extension portion 36b may be formed into complementary shapes (e.g., saw-tooth shape, wavelike shape, etc.) and may be mounted to each other without using an adhesive or the like. When the elastic members are made of a gel material, the elastic members may be potted into the extension portion 36b of the framing member 36 before an organic EL panel is fitted into the framing member 36.

The elastic members may be transparent. This allows the elastic members to be less noticeable when the vehicle lamp is viewed from the front side. In particular, it is preferable that the elastic members be transparent when the framing member and the rear cover are formed of a transparent resin or the like.

In FIG. 2, the elastic members are interposed between the framing member 36 and the organic EL panel 32. In addition thereto or instead thereof, the elastic members may be disposed between the rear cover 40 and the organic EL panel 32.

Figure 3A:
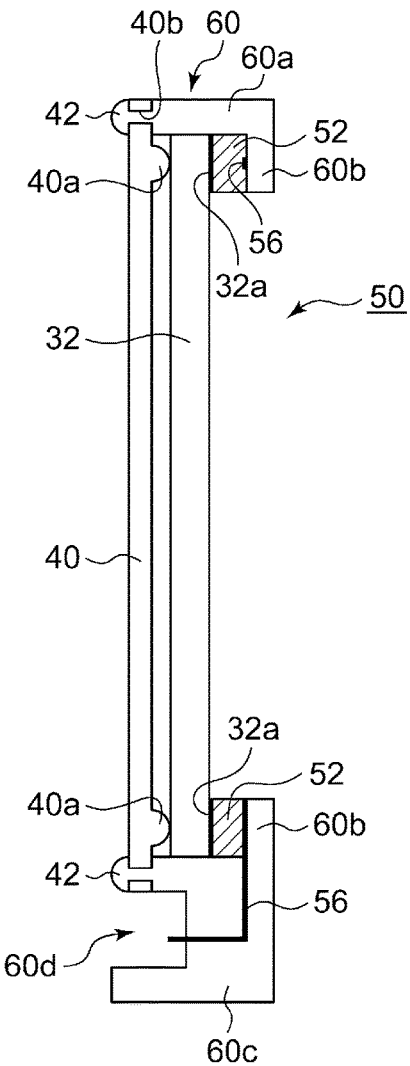
FIG. 3A is a schematic sectional view of a light source unit that includes an organic EL panel in a vehicle lamp according to another example.

FIG. 3A is a schematic sectional view of a light source unit 50 that includes an organic EL panel in a vehicle lamp according to another example of the present embodiment.

The light source unit 50 is fixed to a housing inside a lamp cabinet for a vehicle lamp (not illustrated). The light source unit 50 includes an organic EL panel 32 such as the one illustrated in FIG. 1, a framing member 60, and a rear cover 40.

The framing member 60 is configured to have the organic EL panel 32 fitted thereinto. The inner periphery of the framing member 60 is slightly larger than the outer periphery of the organic EL panel 32.

Figure 3B:
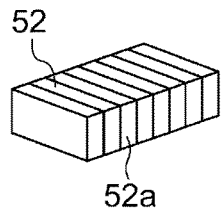
FIG. 3B illustrates an elastic member.
Figure 3C:
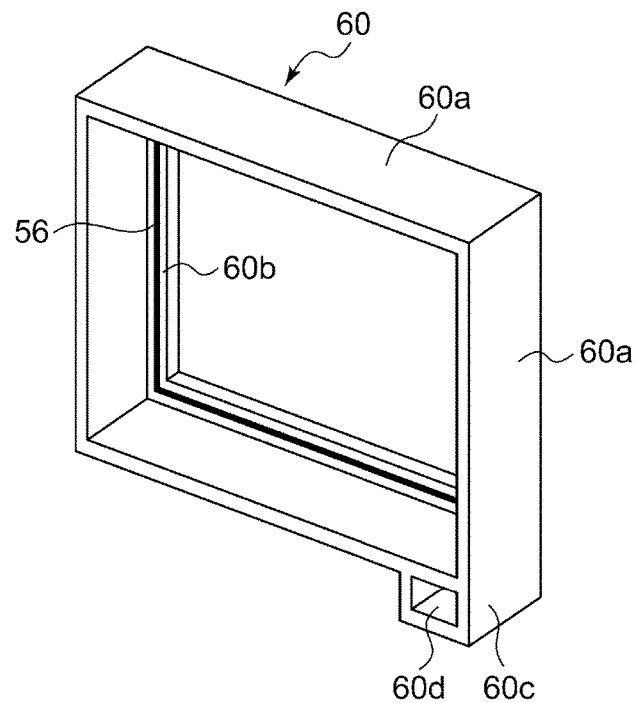
FIG. 3C is a perspective view of a framing member.

FIG. 3C is a rear perspective view of the framing member 60. As illustrated in FIG. 3C, the framing member 60 includes a peripheral wall 60a forming a rectangular enclosure and an extension portion 60b that extends from one end of the peripheral wall 60a toward the inner side. A connector receiving portion 60c that extends downwardly from the peripheral wall 60a and that is bent in an L-shape is formed on the lower side of the framing member 60. The connector receiving portion 60c may be provided on the upper side of the framing member 60 or may be provided on the right or left side of the framing member 60.

The rear cover 40 has a function of pressing the organic EL panel 32 against the framing member 60 from the back side. A convex portion 40a that abuts against the back surface of the panel 32 is provided on the rear cover 40 on a side that faces the organic EL panel 32. The convex portion 40a may be provided only on a peripheral portion of the panel, as illustrated in FIG. 3A, or may be provided on another area.

A plurality of through-holes 40b are formed in the peripheral portion of the rear cover 40, and the rear cover 40 is fixed to the peripheral wall 60a of the framing member 60 by coupling portions 42. The coupling portions 42 may be formed through thermal caulking, welding, bonding, or the like. The rear cover 40 may be fixed by using a lance structure or another member, such as a screw, instead of by forming the coupling portions 42.

In the present example, a busbar 56 is disposed on the extension portion 60b of the framing member 60 on a side toward the organic EL panel. This busbar 56 extends along the extension portion 60b, and an end of the busbar 56 extends into a connector hole 60d formed in the connector receiving portion 60c. This extending portion functions as a connector pin, and electric power can be supplied to the busbar 56 from the outside by inserting a feeder connector of a predetermined shape into the connector receiving portion 60c. The busbar 56 is formed, for example, by cutting out a metal plate into a prescribed shape and bending the cut-out piece.

A feeder portion 32a for supplying electric power to the organic EL emission layer of the organic EL panel 32 is formed on a peripheral portion of the organic EL panel 32 on a side that faces the framing member 60.

A conductive elastic member 52 is interposed between the feeder portion 32a on the organic EL panel 32 and the busbar 56 in the framing member 60. The organic EL panel 32 is pressed by the biasing force of the elastic member 52 and fixed to the framing member. With this configuration, the elastic member functions as a buffer material, and the stress exerted on the substrate for the organic EL panel while the vehicle is running can be reduced.

Electric power is supplied to the feeder portion 32a from the busbar 56 through the conductive elastic member 52. The conductive elastic member 52 is in tight contact with the feeder portion 32a by the biasing force, and thus electric power can be supplied reliably. In addition, the busbar 56 is hidden by the extension portion 60*b* and is invisible from the outside, and thus the appearance of the vehicle lamp improves.

Desirably, a plurality of conductive elastic members 52 are disposed at appropriate intervals in a similar manner to the one illustrated in FIG. 2C instead of providing a conductive elastic member 52 across the entire peripheral portion of the organic EL panel 32. This can provide some play for the organic EL panel to move, and the stress exerted on the substrate for the organic EL panel can be further reduced.

In addition, when the elastic members 52 are disposed so as to be spaced apart from each other, a penetrating space (not illustrated) can be formed between the organic EL panel 32 and the framing member 60, and the air whose temperature has risen by heat emitted from the organic EL panel when electricity is passed to the organic EL panel can pass through the penetrating space. In this case, a vent hole (not illustrated) for allowing the air to pass therethrough is formed in the peripheral wall 60*a* of the framing member 60 at a portion where no elastic member 52 is disposed. With this configuration, a convection current of the air is produced as the air whose temperature has risen by heat emitted from the organic EL panel passes through the penetrating space and the vent hole. Thus, the heat dissipation of the organic EL panel is facilitated, which contributes to an extended lifetime and increased efficiency of the panel.

The elastic member may, for example, be made of an elastomer or a gel material. An elastic member made of an elastomer may be cut into pieces of an appropriate size in advance, and the pieces may be bonded to the extension portion 60*b* of the framing member 60 before an organic EL panel is fitted into the framing member 60. The mounting surface of the elastomer and the mounting surface of the extension portion 60*b* may be formed into complementary shapes (e.g., saw-tooth shape, wavelike shape, etc.) and may be mounted to each other without using an adhesive or the like. When the elastic members are made of a gel material, the elastic members may be potted into the extension portion 60*b* of the framing member 60 before an organic EL panel is fitted into the framing member 60.

The conductive elastic member 52 is, for example, a conductive rubber in which particulate conductors are dispersed in rubber or a conductive rubber formed by winding a wire 52*a* around a rubber (see FIG. 3B), but is not limited thereto. The conductive elastic member 52 may be an anisotropic conductive rubber having conductivity only in a direction connecting the feeder portion 32*a* on the organic EL panel 32 and the busbar 56.

Figure 4:
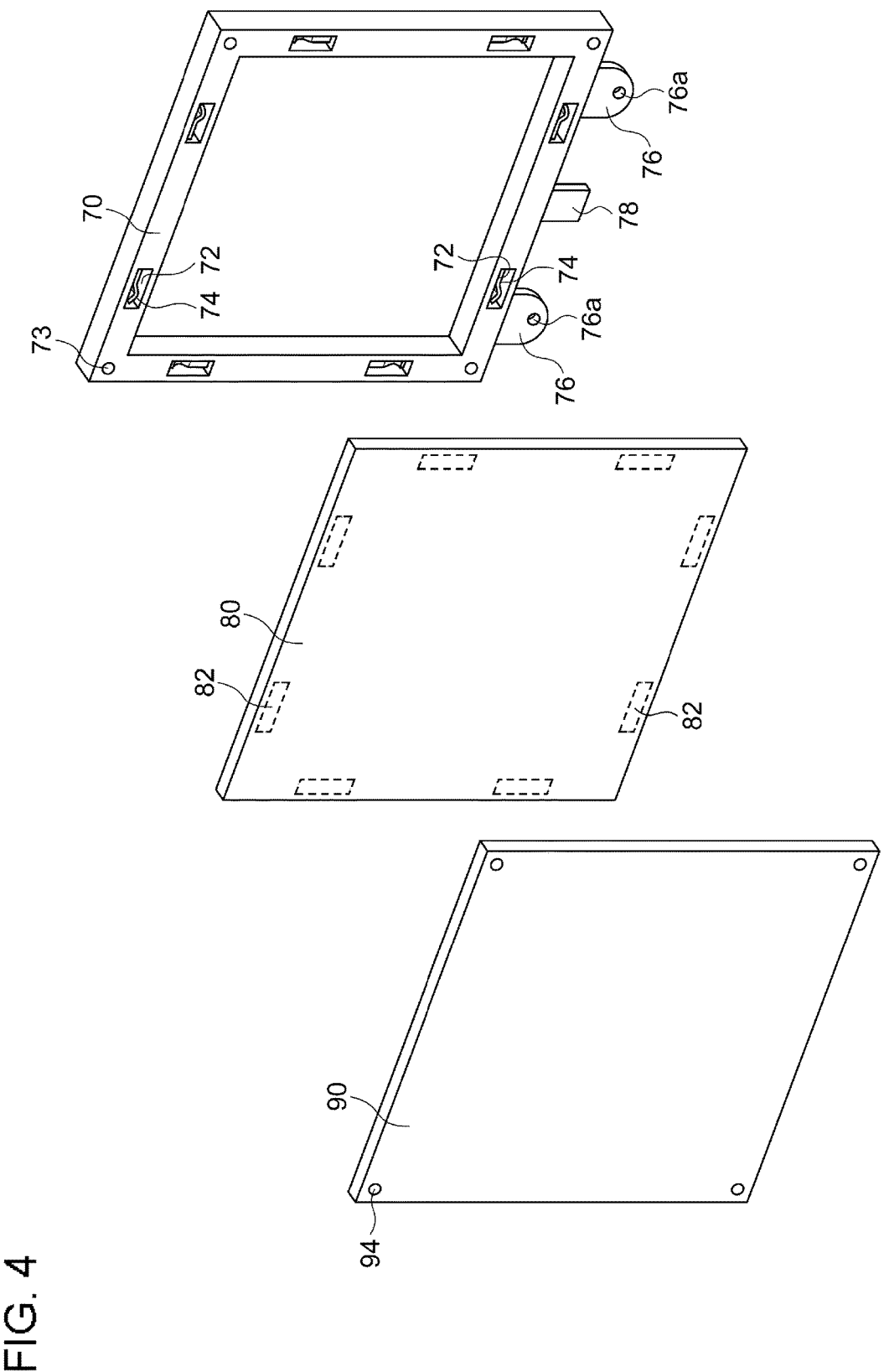
FIG. 4 is an assembly diagram of a light source unit that includes an organic EL panel in a vehicle lamp according to yet another example.
Figure 5:
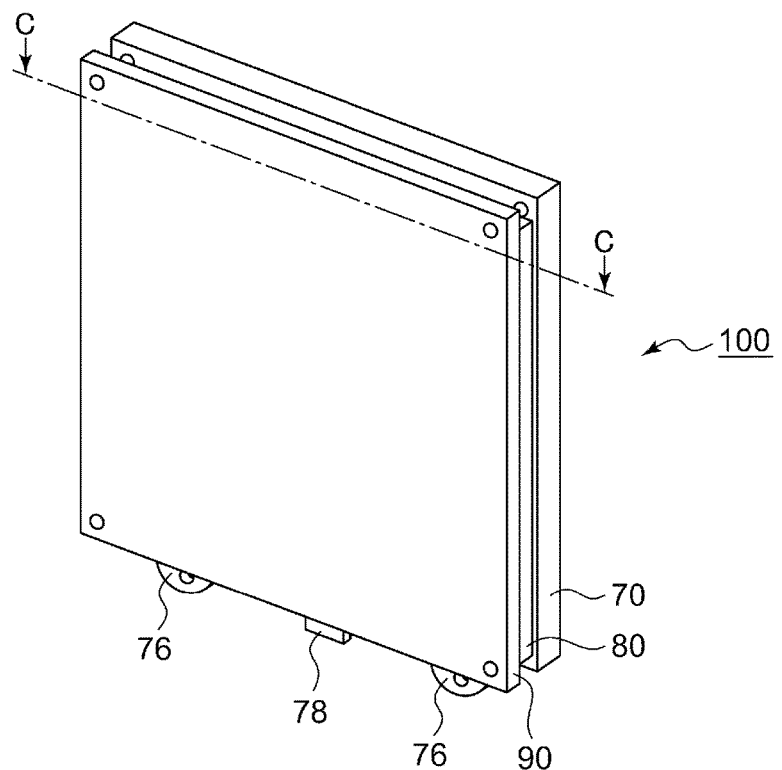
FIG. 5 is a rear perspective view of the assembled light source unit.
Figure 6:
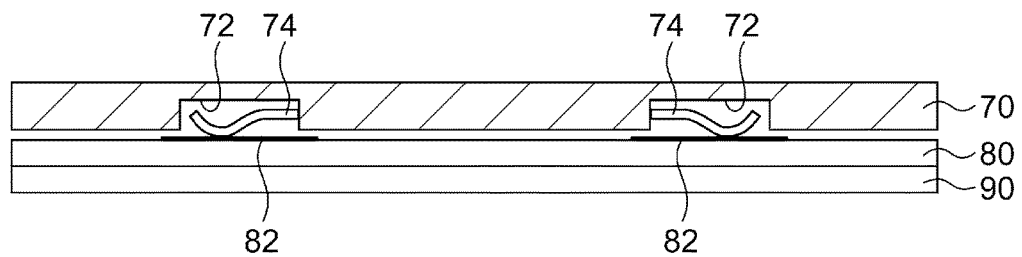
FIG. 6 is a sectional view of the light source unit taken along the line C-C indicated in FIG. 5.

With reference to FIGS. 4 through 6, a vehicle lamp according to yet another example of the present embodiment will be described.

FIG. 4 is an assembly diagram of a light source unit 100 that includes an organic EL panel in a vehicle lamp. FIG. 5 is a rear perspective view of the assembled light source unit 100. FIG. 6 is a sectional view of the light source unit 100 taken along the line C-C indicated in FIG. 5.

The light source unit 100 is constituted by sandwiching an organic EL panel 80 such as the one illustrated in FIG. 1 by a framing member 70 and a rear cover 90. The framing member 70 and the rear cover 90 have an identical outer shape, and the outer shape of the organic EL panel 80 is slightly smaller than the outer shape of the framing member 70 and the rear cover 90.

The framing member 70 is a member for fixing the organic EL panel 80 inside a lamp cabinet for a vehicle lamp (not illustrated). A mounting portion 76 having a bolt hole 76*a* for mounting the light source unit 100 to the housing of the vehicle lamp is formed on the lower side of the framing member 70.

The rear cover 90 has a function of pressing the organic EL panel 80 against the framing member 70 from the back side. A convex portion (not illustrated) that abuts against the back surface of the panel 80 is provided on the rear cover 90 on a side that faces the organic EL panel 80. The convex portion may be provided only on the peripheral portion of the panel or may be provided on another area.

A plurality of through-holes 94 are formed in the rear cover 90 at the four corners, and the rear cover 90 is fixed to the framing member 70 by coupling portions that are passed through the through-holes 94. The coupling portions may be formed through thermal caulking, welding, bonding, or the like. The rear cover 90 may be fixed by using a lance structure or another member, such as a screw, instead of by forming the coupling portions.

A plurality of feeder portions 82 for supplying electric power to the organic EL emission layer of the organic EL panel 80 are provided on a peripheral portion of the organic EL panel 80 on a side that faces the framing member 70. Providing the plurality of feeder portions in this manner can make a uniform current flow through the organic EL emission layer and suppress the luminance unevenness of the emission portion.

Concave portions 72 are formed in the framing member 70 on a side that faces the organic EL panel 80 at positions corresponding to the feeder portions 82. Spring electric contacts 74 are disposed in the respective concave portions 72. The electric contacts 74 are electrically connected by a busbar (not illustrated) embedded inside the framing member 70. The busbar is also electrically connected to a connector 78 formed on the lower side of the framing member 70. Electric power can be supplied to each of the electric contacts 74 through the connector 78.

Each spring electric contact 74 partially projects from the surface of the framing member 70 when the organic EL panel 80 is not mounted to the framing member 70. Therefore, when the organic EL panel 80 is pressed against and fixed to the framing member 70, the electric contacts 74 impart a biasing force on the feeder portions 82 on the organic EL panel 80. Consequently, electric power can be supplied reliably to the feeder portions 82.

In addition, as illustrated in the sectional view in FIG. 6, the biasing force of the spring electric contacts 74 is set such that a slight gap remains between the framing member 70 and the organic EL panel 80 in the assembled light source unit 100. With this configuration, the organic EL panel 80 is fixed between the framing member 70 and the rear cover 90 only by the biasing force of the spring electric contacts 74. Accordingly, the spring electric contacts 74 function as a buffer material, and the stress exerted on the substrate for the organic EL panel while the vehicle is running can be reduced.

The plurality of spring electric contacts 74 are disposed at appropriate intervals, and this can provide some play for the organic EL panel to move, and the stress exerted on the substrate for the organic EL panel can be further reduced.

As described thus far, according to this embodiment, the organic EL panel is fixed by the spring electric contacts disposed on the back side of the framing member 70, and thus the organic EL panel can be fixed without excessive stress exerted thereon. At the same time, electric power can be supplied to the feeder portions disposed on the peripheral portion of the organic EL panel. The busbar is provided inside the framing member, and thus the appearance of the vehicle lamp improves. The busbar may be disposed on the surface of the framing member 70 that faces the organic EL panel 80.

The present embodiment also includes the following configurations.

A vehicle lamp according to an aspect of the present invention includes a planar light-emitting structure having a substrate on which an organic EL emission portion is provided, a framing member that fixes the planar light-emitting structure inside a lamp cabinet for the vehicle lamp, and an elastic member that is interposed between the planar light-emitting structure and the framing member and that fixes the planar light-emitting structure by a biasing force.

According to this aspect, the planar light-emitting structure is fixed by the biasing force of the elastic member, and thus the elastic member serves as a buffer material, which makes it possible to reduce stress exerted on the substrate for the planar light-emitting structure while a vehicle is running.

Electrical contacts through electric power is supplied to the organic EL emission portion may be provided in portions of a peripheral margin of the planar light-emitting structure, and the elastic member may be disposed fronting on the electric contacts, and configured such as to feed electric power via the electrical contacts. This configuration enables the elastic member to fulfill both a function of fixing the planar light-emitting structure and a function of supplying electric power to the planar light-emitting structure.

The elastic member may be disposed in a portion of a side of the framing member fronting on the planar light-emitting structure. This configuration can provide some play for the planar light-emitting structure to move, which makes it possible to further reduce the stress exerted on the substrate for the planar light-emitting structure.

A busbar that supplies electric power to the elastic member may be provided either inside the framing member or on a side of the framing member that confronts the planar light-emitting structure. This configuration can hide the wiring, which improves the appearance of the vehicle lamp.

The elastic member may be disposed such as to provide between the planar light-emitting structure and the framing member a penetrating space that allows air whose temperature has risen by heat emitted from the planar light-emitting structure to pass therethrough is provided. This configuration allows the air to be convected through the penetrating space, which increases the heat dissipation efficiency of the planar light-emitting structure.

Embodiment 2

As described in the background art section, when a planar light-emitting structure is fixed to a bracket, a feeder cord for the planar light-emitting structure is often housed inside the bracket in order to improve the appearance of the lamp. This configuration can, however, lead to an increased thickness of the bracket relative to the thickness of the planar light-emitting structure, resulting in an unfavorable appearance. In addition, there is a problem in that wiring of the cord inside the bracket can be troublesome.

Embodiment 2 addresses such issues and is directed to providing a technique that facilitates mounting of a planar light-emitting structure into a lamp cabinet for a vehicle lamp.

FIGS. 7 through 10 are illustrations for describing a method of fixing an organic EL panel according to Embodiment 2 of the present invention.

FIG. 7A is a plan view of an organic EL panel 130 according to the present embodiment. The organic EL panel 130 is substantially rectangular, and projections 134 are formed on the upper side and a projection 136 is formed on the lower side. These projections can be formed on one or both of the front glass substrate 12 and the rear glass substrate 22 illustrated in FIG. 1. The stacked layers of the anode layer 14 through the cathode layer 20 may or may not be formed in the projections 134 and 136.

The projections 134 are formed, for example, on respective ends of the upper side. A feeder portion 134*a* for supplying electric power to the organic EL emission portion of the organic EL panel 130 is formed at least at a tip of each projection 134. When two projections 134 are provided, a feeder portion electrically connected to the anode layer of the organic EL panel is disposed on one of the projections 134, and a feeder portion electrically connected to the cathode layer is disposed on the other projection 134. The number of projections 134 may be one or three or more. The projection 134 is depicted as having a smoothly curved upper edge in FIG. 7, but the projection 134 may have a different shape. A three-layer MAM consisting of $MoO_3/Al/MoO_3$ is typically used for the feeder portion, but other conductive materials, such as $MoO_3/Ag/MoO_3$, may also be used.

The projection 136 on the lower side extends across substantially the entire length of the lower side. This is for stabilizing the organic EL panel 130 when the projection 136 is plugged into a bracket 142, which will be described later. However, the projection 136 on the lower side may be formed of two or more parts, as in the projections 134 on the upper side. No feeder portion is provided in the projection 136 in the example illustrated in FIG. 7, but in addition to or in place of the projections 134 on the upper side, a feeder portion may be formed in the projection 136 on the lower side.

FIG. 7B is a plan view of a pair of brackets 140 and 142 serving as a fixing member that fixes the organic EL panel 130. The projections 134 on the upper side of the organic EL panel 130 are plugged into the upper bracket 140, and the projection 136 on the lower side of the organic EL panel 130 is plugged into the lower bracket 142. A feeder cord 146 for supplying electric power to the feeder portion 134*a* of the projection 134 is connected to the upper bracket 140.

The brackets 140 and 142 are mounted to an extension of a vehicle lamp (not illustrated). The brackets 140 and 142 may also be mounted to a housing or the like of a lighting device other than a vehicle lamp.

Figure 8A:
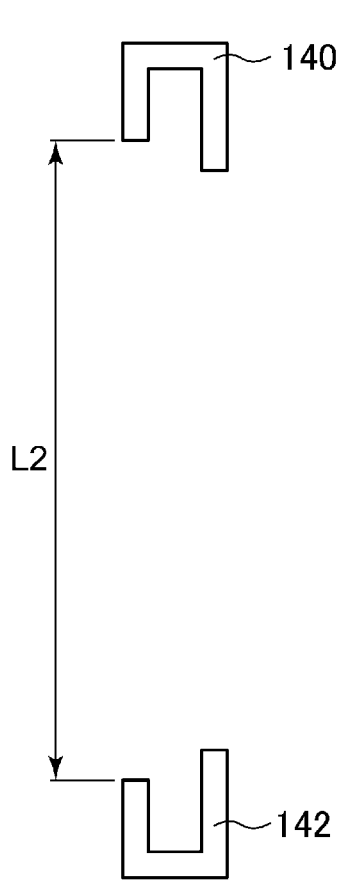
FIGS. 8A and 8B are sectional views of the brackets taken along the line D-D and the line E-E, respectively, indicated in FIG. 7B.
Figure 8B:

FIGS. 8A and 8B are sectional views of the brackets 140 and 142 taken along line D-D and the line E-E, respectively, indicated in FIG. 7B. As can be seen from FIGS. 8A and 8B, the lower bracket 142 has a uniform sectional shape with a concave portion formed therein across its entire length. The upper bracket 140 also has a uniform sectional shape with a concave portion formed therein across its entire length, but an elastic contact portion 144 connected to the feeder cord 146 is disposed at a position on the line E-E, as illustrated in FIG. 8B. The position of the elastic contact portion 144 corresponds to the position of the projection 134 on the upper side of the organic EL panel 130. The elastic contact portion 144 is, for example, a metal piece formed into a spring but may be of a different material, such as a conductive rubber.

The brackets 140 and 142 are mounted to an extension or the like such that the distance L2 between the walls of the upper bracket 140 and the lower bracket 142 on the left side (back side) is slightly smaller than the length L1 (see FIG. 7A) of the organic EL panel 130 in the longitudinal direction.

FIGS. 9A and 9B are sectional views illustrating a process of mounting the organic EL panel 130 to the brackets 140 and 142, taken along the line D-D and the line E-E, respectively, indicated in FIG. 7B. When the organic EL panel 130 is mounted, the projections 134 on the upper side of the organic EL panel 130 are first plugged into the concave portion in the upper bracket 140. As this point, as illustrated in FIG. 9B, the projections 134 on the upper side depress the elastic contact portions 144 provided in the concave portion in the upper bracket 140. Thus, the projections 134 are pushed deep inside the concave portion in the upper bracket 140, and the projection 136 on the lower side can then be plugged into the lower bracket 142.

Figure 10A:
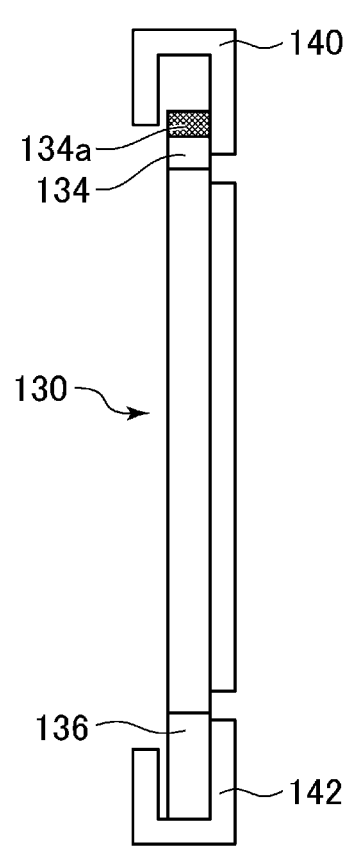
FIGS. 10A and 10B are sectional views of the organic EL panel mounted to the brackets.
Figure 10B:
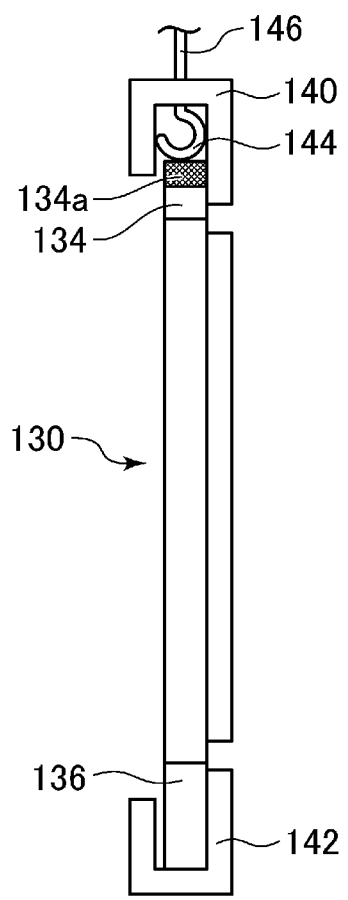

FIGS. 10A and 10B are sectional views illustrating the organic EL panel 130 mounted to the brackets 140 and 142, taken along the line D-D and the line E-E, respectively, indicated in FIG. 7B. As illustrated in FIG. 10A, a gap is present between the upper end of the organic EL panel 130 and the base of the concave portion in the upper bracket 140 at the position on the line D-D. As illustrated in FIG. 10B, a contact between the feeder portion 134a formed in the projection 134 on the upper side and the elastic contact portion 144 is retained at the position on the line E-E. The organic EL panel 130 is pressed against the lower bracket 142 by the biasing force of the elastic contact portions 144, and thus the organic EL panel 130 can be firmly fixed.

In this manner, in the present embodiment, the elastic contact portions that make contact with the feeder portions of the organic EL panel are provided in the concave portion in the bracket, which renders it unnecessary to wire a feeder cord in the concave portion and facilitates mounting of the organic EL panel to the brackets. In addition, the elastic contact portions are provided with both a function of supplying electric power to the organic EL panel and a function of fixing the organic EL panel, and thus the structure of the brackets can be simplified. Accordingly, the thickness of the brackets can be reduced.

FIG. 11 is an illustration for describing a method of fixing an organic EL panel according to another example of the present embodiment.

In the example described with reference to FIGS. 7 through 10, the upper bracket and the lower bracket need to be fabricated in accordance with the outer peripheral shape of the organic EL panel. For example, when the upper side or the lower side of the organic EL panel is curved, the upper bracket or the lower bracket needs to have a concave shape that fits the curve. When the organic EL panel has a complex outer peripheral shape, it can be difficult to plug the projections into the brackets.

Therefore, in this example, a method of fixing organic EL panels of various shapes by using a plurality of fixing brackets prepared as standard components is provided.

Figure 11A:
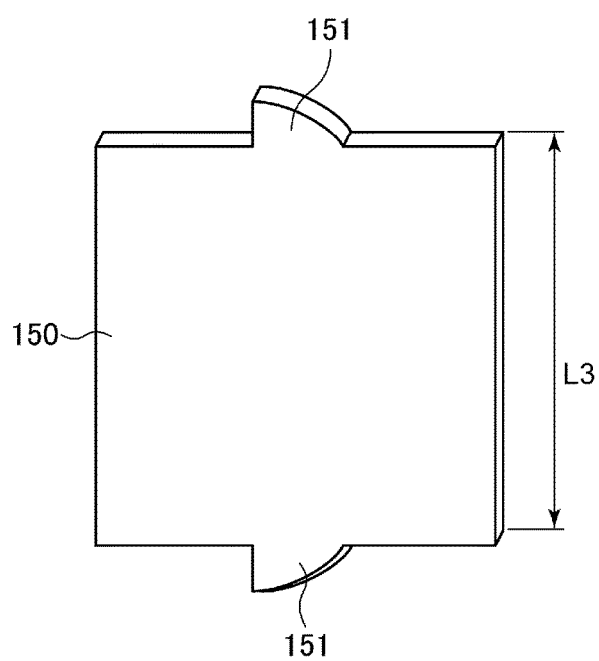
FIGS. 11A and 11B are illustrations for describing a method of fixing an organic EL panel according to another example.

FIG. 11A is a perspective view of an organic EL panel 150 according to the present example. A lance 151 is formed on each of the upper side and the lower side of the organic EL panel 150. The lances 151 have inclined surfaces that are inclined in the same direction. The lances 151 can be formed on one or both of the front glass substrate 12 and the rear glass substrate 22 illustrated in FIG. 1. The stacked layers of the anode layer 14 through the cathode layer 20 may or may not be formed in the lances 151.

Figure 11B:
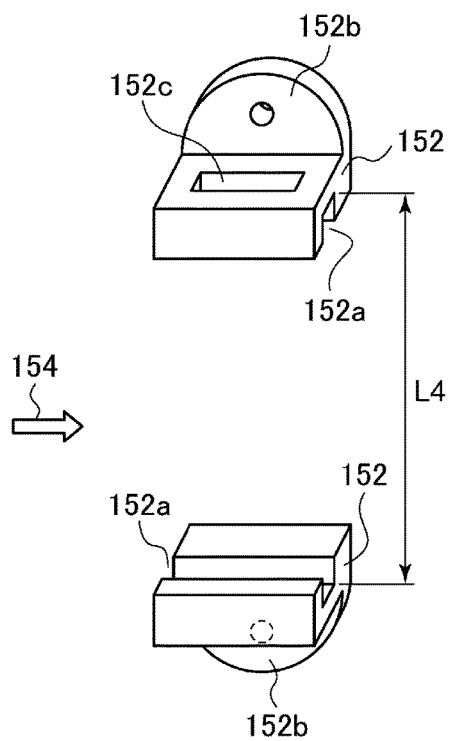

FIG. 11B is a perspective view of fixing brackets 152 according to the present example. Each fixing bracket 152 includes a concave portion 152a formed by two opposing walls, a mounting portion 152b in which a mounting hole for mounting the bracket is provided, and a lance hole 152c formed in the base of the concave portion 152a. The width (width in the horizontal direction of the drawing) of the lance hole 152c is slightly larger than the width of the lance 151.

Two fixing brackets 152 of the same shape are mounted to an extension of a vehicle lamp (not illustrated). At this point, the fixing brackets 152 are mounted such that the distance L4 between the bases of the concave portions in the upper and lower brackets 152 is slightly larger than the length L3 of the organic EL panel 150 in the longitudinal direction.

When the organic EL panel 150 is to be mounted to the brackets 152, the organic EL panel 150 is slid in the direction indicated by the arrow 154. When the lances 151 abut against the fixing brackets 152, the brackets elastically deform slightly, and the lances 151 are received into the lance holes 152c. In this manner, the organic EL panel 150 can be fixed by the pair of fixing brackets 152.

Figure 12:
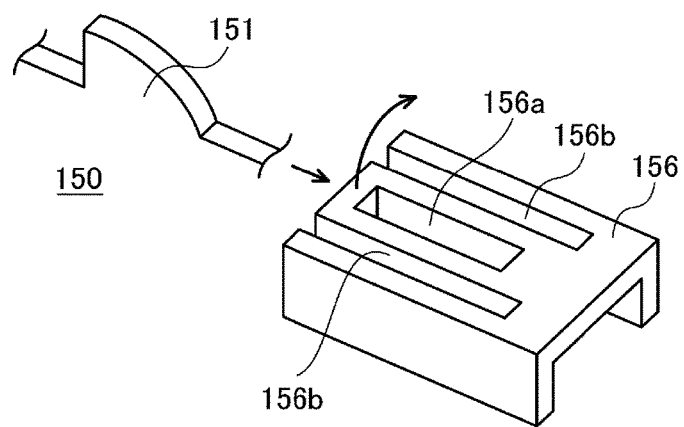
FIG. 12 illustrates a modification of the fixing bracket.

FIG. 12 illustrates a modification of the fixing bracket. In this fixing bracket 156, slits 156b are formed at respective sides of a lance hole 156a. With this configuration, when the organic EL panel 150 is slid into the fixing bracket 156 and the lance 151 abuts against the bracket 156, a portion in which the lance hole 156a is formed elastically deforms easily in the upward direction, and thus the organic EL panel can be mounted with less force.

One of both of the upper and lower brackets 152 illustrated in FIG. 11B may be replaced with the fixing bracket(s) 156 having the slits.

Figure 13:
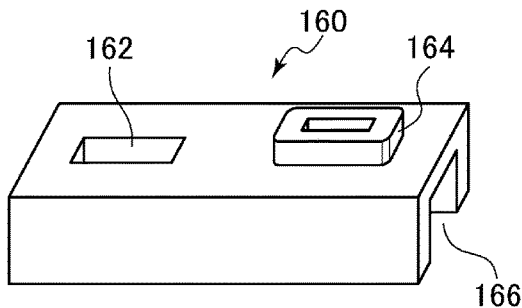
FIG. 13 is a perspective view illustrating a fixing bracket in which a feeder portion is embedded.
Figure 14:
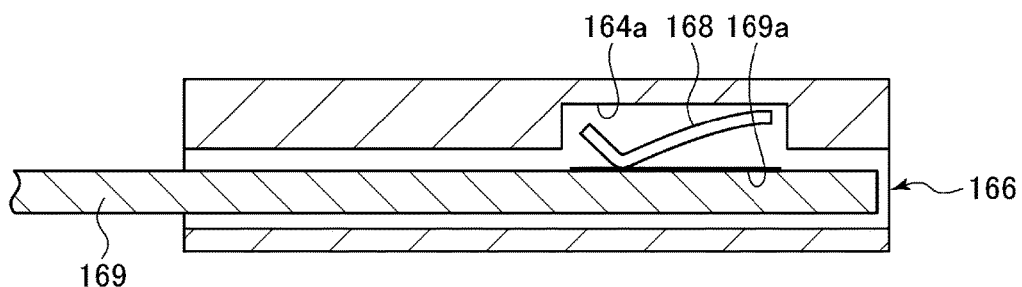
FIG. 14 is a sectional view of the fixing bracket illustrated in FIG. 13 taken along a horizontal plane.

FIG. 13 is a perspective view illustrating a fixing bracket 160 in which an elastic contact portion is embedded, and FIG. 14 is a sectional view of the bracket 160 taken along a horizontal plane.

The fixing bracket 160 includes a concave portion 166 extending in the longitudinal direction, a lance hole 162, and a terminal insertion portion 164 adjacent to the lance hole 162. In the concave portion 166, a concave housing portion 164a is formed in the wall underneath the terminal insertion portion 164, and a spring elastic contact portion 168 is housed in the housing portion 164a. The elastic contact portion 168 is electrically connected to the terminal insertion portion 164. The terminal insertion portion 164 has a shape that allows a feeder terminal of a predetermined standard to be inserted thereinto.

When an organic EL panel 169 is slid along the concave portion 166 in the bracket and a lance (not illustrated) engages with the lance hole 162, a feeder portion 169a formed on the back surface of the organic EL panel 169 makes electrical contact with the elastic contact portion 168. In this manner, the single fixing bracket 160 can fix the organic EL panel and can also supply electric power to the organic EL panel. One of both of the upper and lower brackets 152 illustrated in FIG. 11B may be replaced with the fixing bracket(s) 160.

Figure 15:
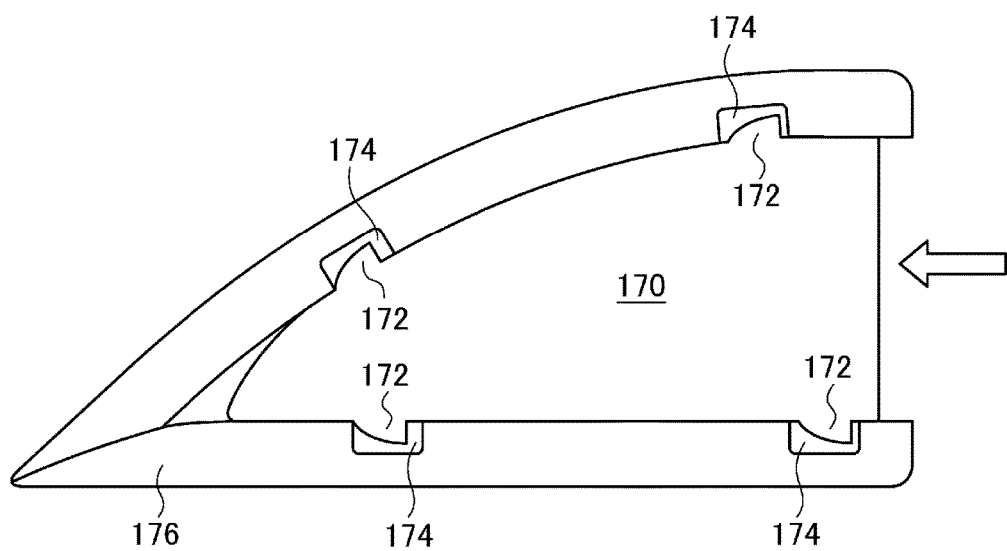
FIG. 15 is a conceptual diagram for describing an arrangement of fixing brackets configured to fit organic EL panels of various outer shapes.

FIG. 15 is a conceptual diagram for describing an arrangement of fixing brackets configured to fit organic EL panels of various outer shapes. As illustrated in FIG. 15, a plurality of lances 172 are formed on the outer periphery of an organic EL panel 170 having an outer shape that is not rectangular. Fixing brackets are mounted on an extension 176 of the vehicle lamp such that the same number of lance holes 174 as the number of the lances 172 are disposed so as to match the positions of the lances 172. When the organic EL panel 170 is slid in the direction indicated by the arrow in FIG. 15, the four lances 172 engage with the respective lance holes 174, and the organic EL panel 170 can be fixed.

FIG. 16A is a perspective view for describing a method of fixing an organic EL panel according to yet another example of the present embodiment. A fixing bracket 180 is mounted in a lamp cabinet for a vehicle lamp (not illustrated). The fixing bracket 180 has a concave portion 184 formed therein for receiving the lower side of an organic EL panel 200. In addition, as illustrated in the sectional view in FIG. 16B, a plurality of through-holes 186 are formed in one of the walls forming the concave portion 184. As illustrated in FIG. 16C, an electrical connection portion 192 is disposed in the concave portion 184 in the fixing bracket 180. The electrical connection portion 192 includes an elastic contact portion (see FIG. 18).

The organic EL panel 200 is inserted into the concave portion 184 in the fixing bracket 180. Thereafter, an adhesive is injected into the concave portion 184 through the through-holes 186. Thus, the organic EL panel 200 is fixed to the fixing bracket 180.

As illustrated in FIG. 16, a portion of the organic EL panel 200 is fixed to the fixing bracket 180 with an adhesive, and thus the organic EL panel can be fixed without providing the brackets on the entire periphery of the organic EL panel.

Figure 17A:
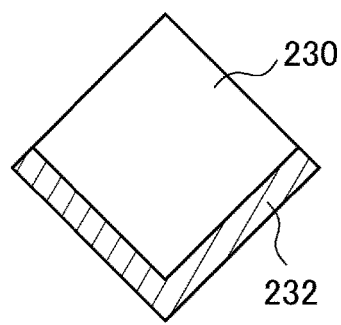
FIGS. 17A and 17B illustrate usage examples of the fixation method illustrated in FIG. 16.
Figure 17B:
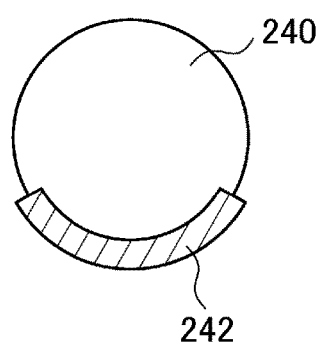

FIGS. 17A and 17B illustrate usage examples of the fixation method illustrated in FIG. 16. In FIG. 17A, only two sides of a square organic EL panel 230 are fixed to a fixing bracket 232 with an adhesive, and the remaining two sides are left exposed. In FIG. 17B, only approximately one-third of the periphery of a circular organic EL panel 240 is fixed to a fixing bracket 242 with an adhesive, and the remaining peripheral portion is left exposed. When an organic EL panel is fixed in this manner, the exposed portion can look as if it is floating.

Figure 18:
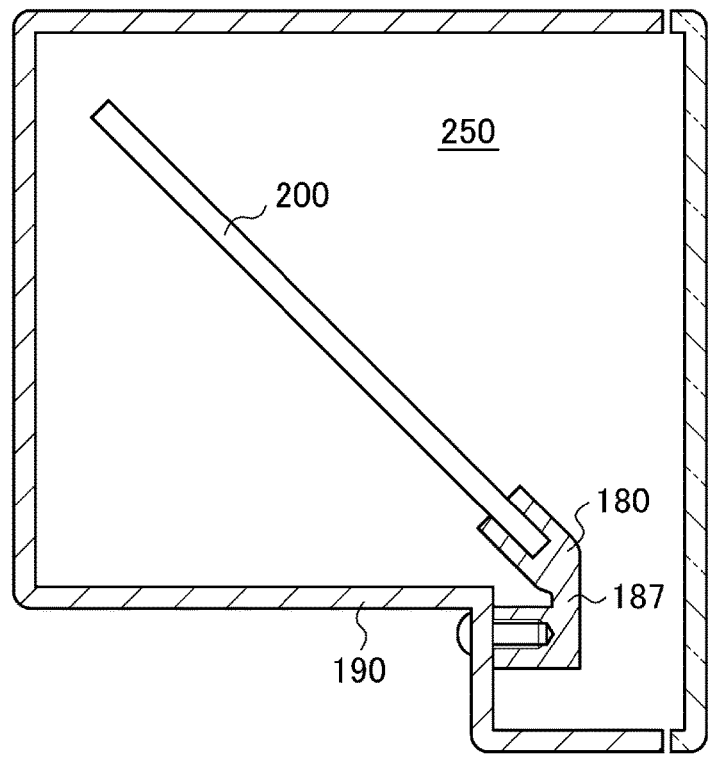
FIG. 18 illustrates another usage example of the fixation method illustrated in FIG. 16.

FIG. 18 illustrates another usage example of the fixation method illustrated in FIG. 16. A fixing bracket 180 having a bent portion 187 is fixed to a housing 190 of a lamp with a screw or the like. An organic EL panel 200 is fixed to the fixing bracket 180 with an adhesive. Thus, the organic EL panel 200 can be disposed so as to be inclined in a lamp cabinet 250 for a lamp. In this case, in place of disposing an electrical connection portion 192 such as the one illustrated in FIG. 16C in the concave portion in the fixing bracket 180, a different feeder structure, such as soldering fixation, may be used.

Figure 19:
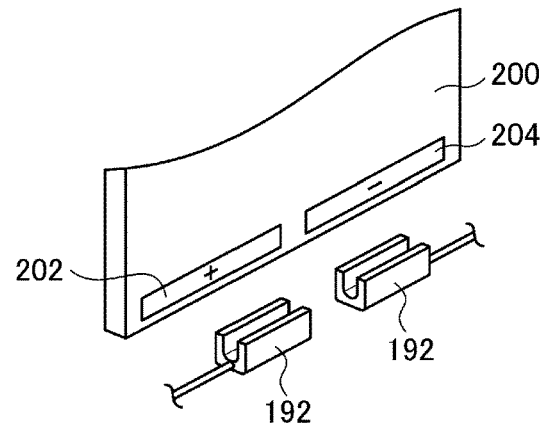
FIG. 19 illustrates a connection between an electrical connection portion and an organic EL panel.

FIG. 19 illustrates a connection between the electrical connection portion 192 and the organic EL panel. A feeder portion 202 electrically connected to the anode layer of the organic EL panel and a feeder portion 204 electrically connected to the cathode layer are formed on the back surface of the organic EL panel 200, and the feeder portions 202 and 204 make contact with the electrical connection portions 192 upon being inserted into the concave portion 184 in the fixing bracket 180.

Figure 20:
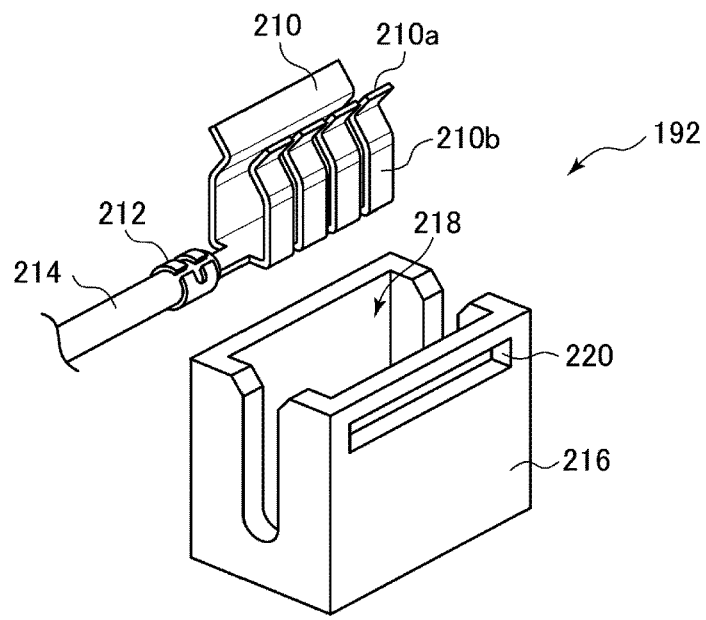
FIG. 20 is a perspective view illustrating a more detailed structure of the electrical connection portion.
Figure 21:
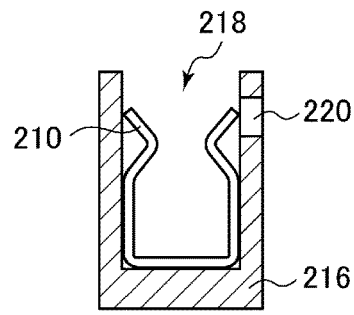
FIG. 21 is a sectional view of the electrical connection portion taken along a direction orthogonal to the longitudinal axis.

FIG. 20 is a perspective view illustrating a more detailed structure of the electrical connection portion 192, and FIG. 21 is a sectional view of the electrical connection portion 192 taken along a direction orthogonal to the longitudinal axis.

The electrical connection portion 192 includes an elastic contact portion 210 and a case 216. The elastic contact portion 210 is connected to a feeder cord 214 through, for example, a caulking member 212. The elastic contact portion 210 is formed by bending a metal plate so as to have a substantially f-shaped cross-section. A plurality of slits are formed in one side of the elastic contact portion 210, and portions 210b divided by the slits each function as an independent spring.

The elastic contact portion 210 is housed in a concave portion 218 formed in the case 216 and is fixed therein with an adhesive or the like injected through an opening 220. Instead of using the case 216, the elastic contact portion 210 may be directly connected to a substrate, such as a flexible printed circuit (FPC).

When the organic EL panel 200 is inserted into the concave portion 184 in the fixing bracket 180, the feeder portions 202 and 204 provided on the organic EL panel 200 enter the interior of the elastic contact portion 210. Thus, the feeder portions 202 and 204 become electrically connected to the elastic contact portion 210, and the organic EL panel 200 is fixed by the biasing force of the elastic contact portion 210.

As described thus far, according to the present embodiment, the elastic contact portion constituted by a metal plate is used, and thus electric power can be supplied reliably to the organic EL panel. In addition, the elastic contact portion is invisible from the outside because of the case 216, and thus the appearance of the lamp improves.

In each of the foregoing embodiments, a single organic EL panel is fixed by a single framing member. Alternatively, a plurality organic EL panels disposed side by side can be fixed by a single framing member.

In addition, rectangular organic EL panels have been described above, but the shape of an organic EL panel is not particularly limited, and any desired shape can be employed. In such a case, a framing member or a rear cover is formed to fit the outer shape of an organic EL panel.

The vehicle lamp according to each of the embodiments described above can be used, for example, as a clearance lamp, a daytime lamp, a turn-signal lamp, a tail lamp, a stop lamp, or the like.

In each of the foregoing embodiments, a generally flat organic EL panel has been described. Alternatively, an organic EL panel may be curved or bent by using, instead of a glass substrate, an ultrathin glass or a transparent resin that can accommodate to a curved surface. When such an organic EL panel is inserted into the fixing brackets described above, a resin or metal reinforcement may be affixed to an end of the organic EL panel. The above-described embodiments can also be applied to a planar light-emitting structure other than an organic EL panel with any necessary modifications made thereto.

The present embodiment also includes the following configurations.

1. A vehicle lamp, comprising:
a planar light-emitting structure having a substrate on which an organic EL emission portion is provided; and
a fixing member that fixes the planar light-emitting structure inside a lamp cabinet for the vehicle lamp,
a feeder portion for supplying electric power to the organic EL emission portion being provided at a portion of a periphery of the planar light-emitting structure, wherein
the fixing member includes
a concave portion that receives the portion of the planar light-emitting structure where the feeder portion is provided, and
an elastic contact portion that is provided in the concave portion and that makes contact with the feeder portion.

2. The vehicle lamp according to 1, wherein
the planar light-emitting structure is fixed inside the concave portion by a biasing force of the elastic contact portion.

3. The vehicle lamp according to 1 or 2, wherein
a plurality of the fixing members of an identical shape are provided, and
the plurality of fixing members are disposed inside the lamp cabinet in accordance with an outer peripheral shape of the planar light-emitting structure.

4. The vehicle lamp according to 3, wherein
a lance is provided on an outer periphery of the planar light-emitting structure, and
a lance hole that engages with the lance is provided in a base of the concave portion in the fixing member.

5. The vehicle lamp according to any one of 1 through 4, wherein
the elastic contact portion is disposed in the concave portion, and
the elastic contact portion is then fixed by injecting an adhesive into the concave portion.

Embodiment 3

Vehicle lamps that include planar light-emitting structures, such as organic electroluminescence (EL) panels, are known. For example, JP2013-45523 discloses a vehicle lamp in which a flat surface light source constituted by a flexible belt-like light-emitting material is installed in a lamp cabinet formed by a housing and a translucent cover.

Typically, an anode feeder portion and a cathode feeder portion are disposed on the rear side of an organic EL panel along the outer periphery of the panel, and an anisotropic conductive adhesive film is used to couple these feeder portions to a flexible circuit (FPC) that supplies electric power from the outside. With this structure, however, the shape of the flexible circuit bonded to the feeder portions becomes complex, leading to a problem in that the reliability decreases due to the bonding being lost or the material cost increases.

Embodiment 3 addresses such issues and is directed to providing a technique by which the shape of a substrate, such as a flexible circuit, for supplying electric power to a planar light-emitting structure is simplified and the reliability of a lamp increases in a vehicle lamp that includes a planar light-emitting structure, such as an organic EL panel.

Figure 22:
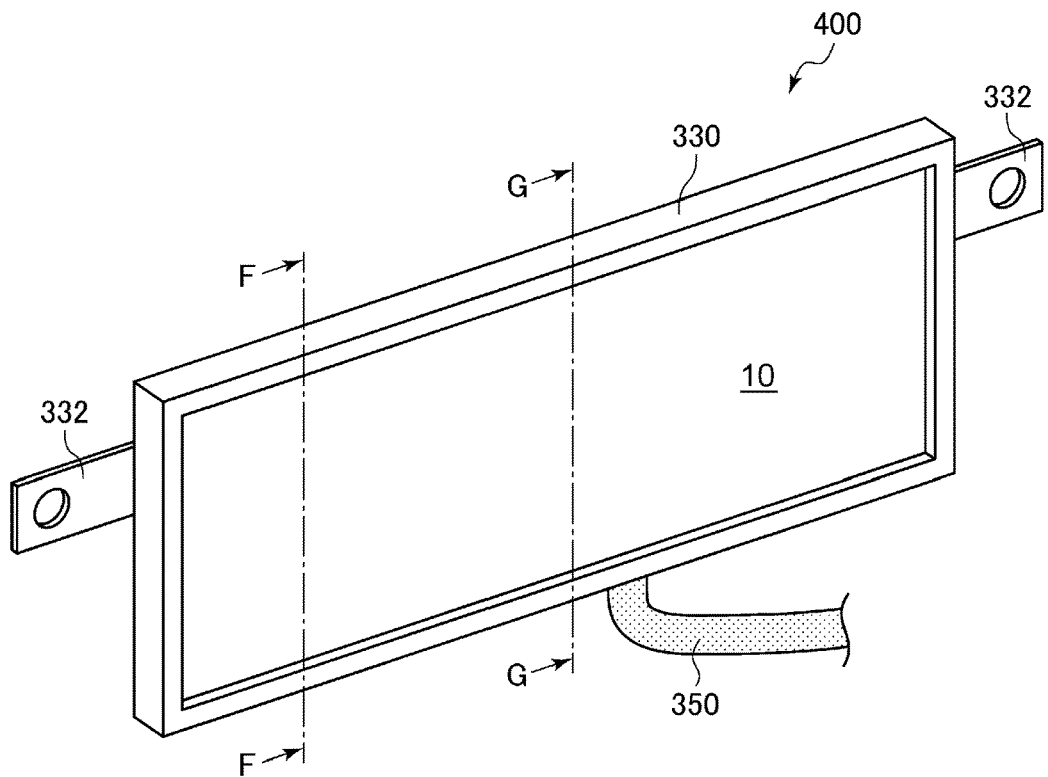
FIG. 22 is a schematic perspective view of a vehicle lamp according to yet another embodiment of the present invention.

FIG. 22 is a schematic perspective view of a vehicle lamp 400 according to Embodiment 3 of the present invention. The vehicle lamp 400 includes a planar light-emitting structure 10 such as the organic EL panel illustrated in FIG. 1, a fixing member 330 that fixes and supports the planar light-emitting structure inside a lamp cabinet, and a flexible circuit 350 for supplying electric power to the planar light-emitting structure 10.

An anode feeder portion (not illustrated) electrically connected to the anode layer of the planar light-emitting structure and a cathode feeder portion (not illustrated) electrically connected to the cathode layer of the planar light-emitting structure are formed on the back surface of the planar light-emitting structure 10. A three-layer MAM consisting of $MoO_3/Al/MoO_3$ is typically used for these feeder portions, but $MoO_3/Ag/MoO_3$ may also be used. Since the feeder portions of MAM cannot be soldered, the flexible circuit 350 is bonded to these feeder portions by using an anisotropic conductive adhesive film.

A rib 332 having a mounting hole formed therein for mounting the fixing member 330 to a housing (not illustrated) for the vehicle lamp is provided on the fixing member 330. The vehicle lamp 400 is used, for example, as a marker lamp, such as a clearance lamp, a daytime lamp, a turn-signal lamp, a tail lamp, or a stop lamp.

Figure 23A:
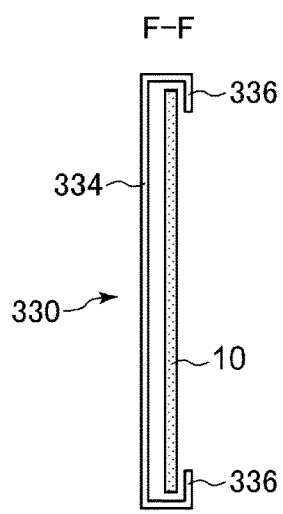
FIG. 23A is a longitudinal sectional view taken along the line F-F indicated in FIG. 22.
Figure 23B:
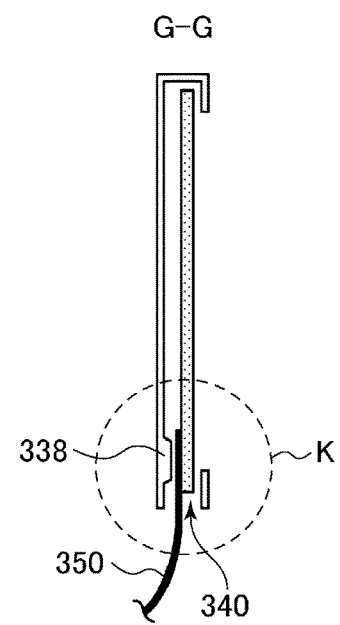
FIG. 23B is a longitudinal sectional view taken along the line G-G indicated in FIG. 22.

FIG. 23A is a longitudinal sectional view taken along the line F-F indicated in FIG. 22, and FIG. 23B is a longitudinal sectional view taken along the line G-G indicated in FIG. 22. The fixing member 330 includes a concave portion 336 that extends along the outer periphery of the planar light-emitting structure 10 and that supports the outer periphery and a base 334 that opposes the back surface of the planar light-emitting structure 10. As illustrated in FIG. 23B, one or a plurality of convex portions 338 and drain holes 340 are formed in the concave portion 336 on the lower side. These will be described later with reference to FIG. 30.

Figure 24A:
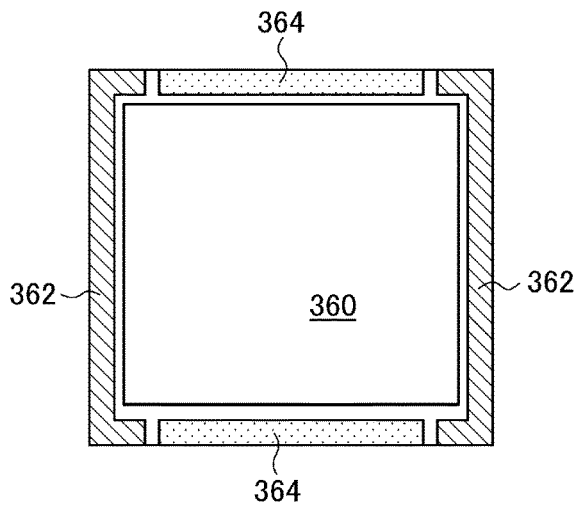
FIG. 24A is a schematic plan view illustrating an arrangement of feeder portions on the back surface of a planar light-emitting structure according to a conventional technique.
Figure 24B:
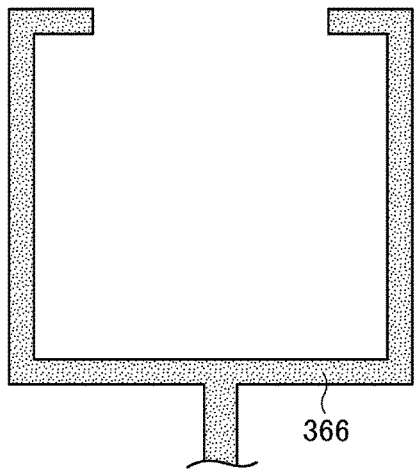
FIG. 24B is a schematic plan view illustrating a flexible circuit to be bonded to feeder portions.

FIG. 24A is a schematic plan view illustrating an arrangement of feeder portions on the back surface of a planar light-emitting structure 360 according to a conventional technique, and FIG. 24B is a schematic plan view illustrating a flexible circuit 366 to be bonded to feeder portions.

As described above, a transparent conductive film having a high resistance is typically used as an anode layer of a planar light-emitting structure. Therefore, in order to make the current density in an organic EL emission layer as uniform as possible and to reduce the luminance unevenness, it is preferable that the area of an anode feeder portion that supplies electric power to the anode layer be as large as possible.

Conventionally, as illustrated in FIG. 24A, when the planar light-emitting structure 360 is rectangular, for example, two anode feeder portions 362 extending linearly are disposed on two opposing sides, and two cathode feeder portions 364 extending linearly are disposed on the remaining two sides. Furthermore, the terminals of each anode feeder portion 362 are bent so that the anode feeder portion 362 becomes longer than the cathode feeder portion 364, and thus the area of the anode feeder portions is increased with respect to the area of the cathode feeder portions.

The flexible circuit 366 needs to be in contact with the terminal portions of both the anode feeder portions and the cathode feeder portions. Thus, when the feeder portions are disposed as described above, the flexible circuit 366 needs to be formed into a complex shape that extends in a substantially U-shape along the outer periphery of the planar light-emitting structure 360, as illustrated in FIG. 24B. As can be seen from FIG. 24B, since the thin flexible circuit is structured to extend along the outer periphery of the planar light-emitting structure, the flexible circuit easily peels off from the feeder portions, leading to a problem in that electric power is fed poorly or the fabrication cost of the flexible circuit increases.

Accordingly, in the present embodiment, the area of the anode feeder portion of the planar light-emitting structure is increased to reduce the luminance unevenness, and an arrangement of feeder portions that increases the reliability of bonding with the flexible circuit is provided.

Figure 25:
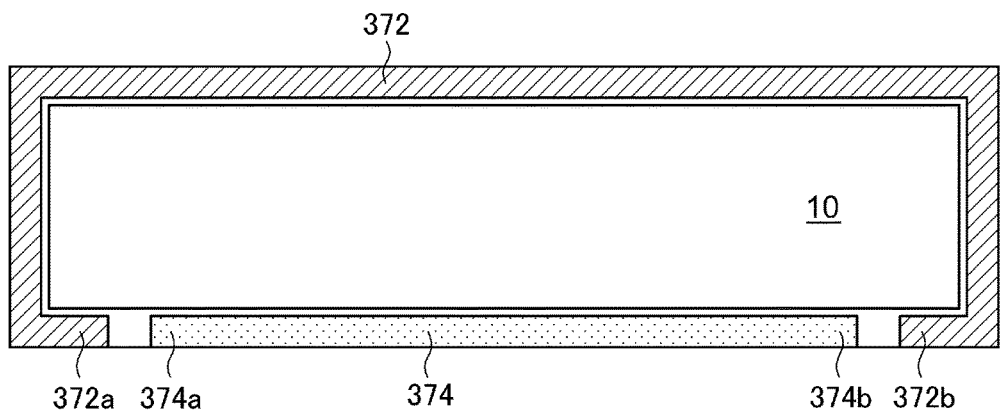
FIG. 25 illustrates an exemplary arrangement of feeder portions on the back surface of a planar light-emitting structure according to the present embodiment.

FIG. 25 illustrates an exemplary arrangement of feeder portions on the back surface of a planar light-emitting structure 10 according to the present embodiment. As illustrated in FIG. 25, in this example, a linear anode feeder portion 372 and a linear cathode feeder portion 374 are provided along the outer periphery of the back surface of the planar light-emitting structure 10. Unlike the conventional example illustrated in FIG. 24, a single anode feeder portion 372 and a single cathode feeder portion 374 are provided. The anode feeder portion 372 has a substantially U-shape that extends along three sides of the outer periphery of the rectangular planar light-emitting structure 10 and extends into the remaining one side at the right and left ends thereof. The cathode feeder portion 374 extends linearly along the remaining one side. Consequently, two terminal portions 372a and 372b of the anode feeder portion 372 and two terminal portions 374a and 374b of the cathode feeder portion 374 are all located on the lower side of the planar light-emitting structure 10.

When measured along the outer periphery of the planar light-emitting structure 10, the anode feeder portion 372 is much longer than the cathode feeder portion 374. As the anode feeder portion is made longer than the cathode feeder portion in this manner, the area of the anode feeder portion is further increased, and the luminance unevenness of the planar light-emitting structure can be reduced as compared to the conventional example.

Figure 26:
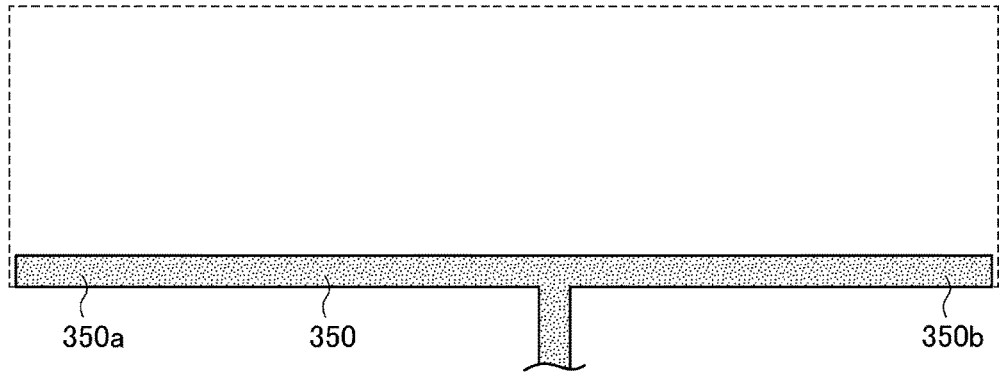
FIG. 26 illustrates an example of a flexible circuit to be bonded to the planar light-emitting structure illustrated in FIG. 25.

FIG. 26 is a schematic plan view illustrating an example of a flexible circuit 350 to be bonded to the planar light-emitting structure 10 illustrated in FIG. 25. As described above, the two terminal portions 372a and 372b of the anode feeder portion 372 and the two terminal portions 374a and 374b of the cathode feeder portion 374 are concentrated on the lower side of the planar light-emitting structure 10, and thus the flexible circuit 350 to be connected to the anode feeder portion 372 and the cathode feeder portion 374 may have a simple linear shape that extends along the lower side of the planar light-emitting structure. In other words, the flexible circuit 350 is formed such that one end 350a of the flexible circuit 350 connects to the terminal portion 372a of the anode feeder portion 372 and the terminal portion 374a of the cathode feeder portion 374 and the other end 350b of the flexible circuit 350 connects to the terminal portion 372b of the anode feeder portion 372 and the terminal portion 374b of the cathode feeder portion 374. In this manner, by simplifying the shape of the flexible circuit, the material cost and the fabrication cost of the flexible circuit are reduced. In addition, the flexible circuit is less likely to peel off since the bonding area is small. Consequently, the reliability in supplying electric power increases.

Figure 27:
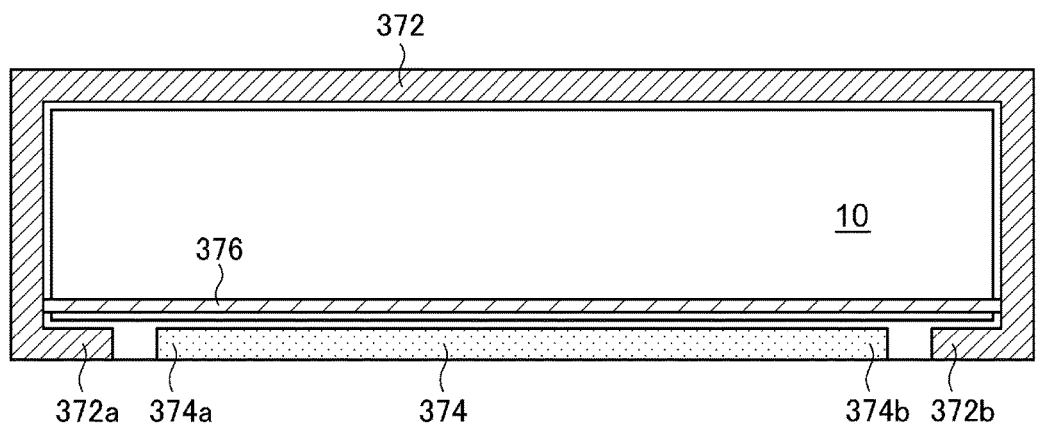
FIG. 27 is a schematic plan view illustrating another exemplary arrangement of feeder portions on the back surface of the planar light-emitting structure.

FIG. 27 is a schematic plan view illustrating another exemplary arrangement of feeder portions on the back surface of the planar light-emitting structure 10. In this example, in addition to the anode feeder portion 372 illustrated in FIG. 25, a second anode feeder portion 376 that extends along the lower side of the planar light-emitting structure 10 is provided. In other words, the anode feeder portions include a portion formed annularly along the outer periphery of the planar light-emitting structure 10. With this configuration, the area of the anode feeder portions is further increased, and thus the luminance unevenness can be further reduced. In this case as well, electric power can be supplied to the planar light-emitting structure by using the flexible circuit 350 illustrated in FIG. 26.

Figure 28:
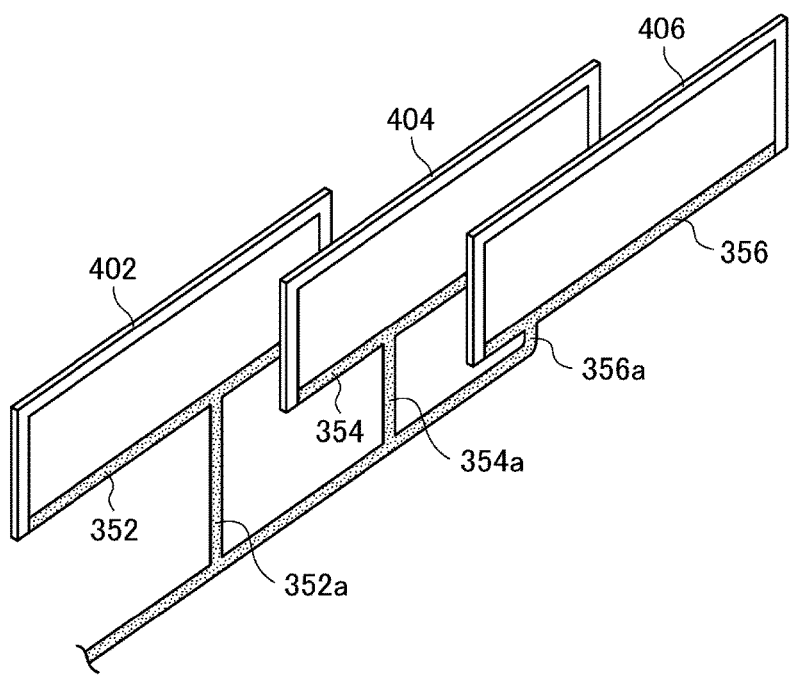
FIG. 28 illustrates a schematic configuration to be employed when a plurality of planar light-emitting structures are installed in a lamp cabinet for a vehicle lamp.

FIG. 28 illustrates a schematic configuration to be employed when a plurality of planar light-emitting structures 402, 404, and 406 are installed in a lamp cabinet for a vehicle lamp. As illustrated in FIG. 28, flexible circuits 352, 354, and 356 are bonded to the lower sides of the respective emitters, and wires 352a, 354a, and 356a to the power source are oriented in the same direction. Thus, the flexible circuits can be bonded to one another with ease.

By combining the plurality planar light-emitting structures as described above to increase the illuminance, the planar light-emitting structures can also be used as a headlamp.

Figure 29A:
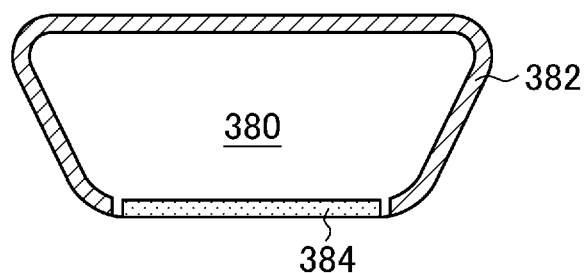
FIGS. 29A through 29C illustrate exemplary arrangements of an anode feeder portion and a cathode feeder portion in planar light-emitting structures of various shapes.
Figure 29B:
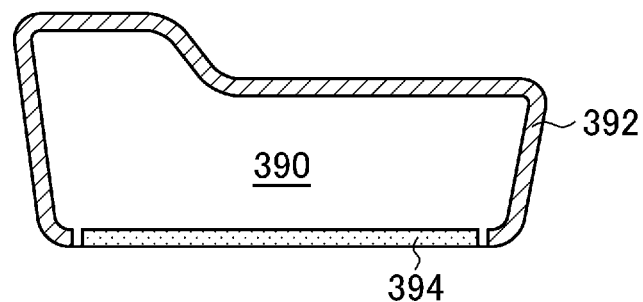
Figure 29C:
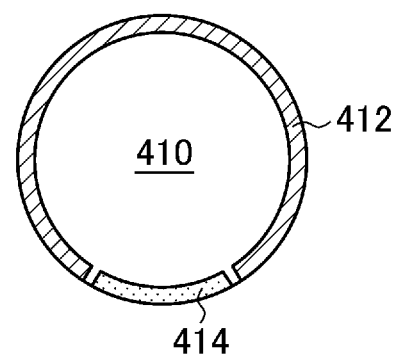

In the foregoing, rectangular planar light-emitting structures have been described, but the present embodiment can also be applied to planar light-emitting structures having other shapes. FIGS. 29A through 29C illustrate exemplary arrangements of an anode feeder portion and a cathode feeder portion in planar light-emitting structures of various shapes.

FIG. 29A illustrates a case in which a planar light-emitting structure 380 is trapezoidal. As in the case of a rectangular planar light-emitting structure, an anode feeder portion 382 and a cathode feeder portion 384 are formed on the outer periphery of the planar light-emitting structure 380 such that the terminal portions of the anode feeder portion 382 and the cathode feeder portion 384 are located on the lower side. FIG. 29B illustrates a case in which a planar light-emitting structure 390 has an irregular shape. In this case as well, an anode feeder portion 392 and a cathode feeder portion 394 may be formed on the outer periphery of the planar light-emitting structure 390 such that the terminal portions of the anode feeder portion 392 and the cathode feeder portion 394 are normally located on the lower side. FIG. 29C illustrates a case in which a planar light-emitting structure 410 is circular. In this case, an anode feeder portion 412 and a cathode feeder portion 414 are formed on the outer periphery of the planar light-emitting structure 410 such that the terminal portions of the anode feeder portion 412 and the cathode feeder portion 414 are located in an arc portion on the lower side (e.g., with a center angle of 90°).

In any of the cases illustrated in FIGS. 29A through 29C, the anode feeder portion can be formed annularly by providing an additional anode feeder portion described with reference to FIG. 27.

As described thus far, when a single linear anode feeder portion and a single linear cathode feeder portion that are electrically connected to the anode layer and the cathode layer, respectively, are provided on the outer periphery of the back surface of a planar light-emitting structure, by making the anode feeder portion longer than the cathode feeder portion, the luminance unevenness of the planar light-emitting structure can be reduced. In addition, by disposing the anode feeder portion and the cathode feeder portion such that their terminal portions are as close as possible, the shape of the flexible circuit can be simplified, and thus the flexible circuit is less likely to peel off. In addition, the fabrication cost of the flexible circuit is reduced.

Hereinafter, a structure that makes a flexible circuit even less likely to peel off will be described.

FIGS. 30A and 30B are enlarged views of a portion marked by K in FIG. 23B. As described above, the feeder portions on the planar light-emitting structure 10 and the flexible circuit 350 are coupled on the lower side of the planar light-emitting structure. The feeder portions on the planar light-emitting structure 10 and the flexible circuit 350 are bonded with an anisotropic conductive adhesive film 342. The drain holes 340 are formed at appropriate intervals in the concave portion 336 in the fixing member 330 on a side along the lower side. With this configuration, the possibility that condensed water accumulates in the concave portion 336 and the adhesive film 342 is soaked in the water to lose the bonding is reduced.

In addition, it is preferable that the convex portion 338 having a flat top be formed on the base 334 of the fixing member 330 at a position corresponding to a position at which the adhesive film 342 is bonded to a feeder portion on the planar light-emitting structure. As this convex portion 338 presses the bonded portion, the flexible circuit 350 is less likely to peel off, and the reliability in supplying electric power increases. This convex portion 338 may extend linearly in the horizontal direction along the bonded portion, or a plurality short convex portions may be provided at appropriate intervals.

As described above, typically, a planar light-emitting structure and a flexible circuit are bonded with an anisotropic conductive adhesive film interposed therebetween. The inventors of the present application have devised the following two methods as alternatives to the above method.

Method 1: Bonding surfaces of a feeder portion on a planar light-emitting structure and of a flexible circuit are subjected to surface treatment through Au plating, Sn plating, or Cu plating, and the two bonding surfaces are bonded by soldering.

Method 2: Bonding surfaces of a feeder portion on a planar light-emitting structure and of a flexible circuit are subjected to surface treatment through Au plating, Sn plating, or Cu plating, and the two bonding surfaces are bonded by using ultrasonic vibrations.

In either case, it was confirmed that bonding that was equally reliable to or more reliable than the bonding obtained when an anisotropic conductive adhesive film was used was achieved. In this case as well, as illustrated in FIG. 30B, providing the convex portion 338 that presses a bonding portion 344 on the base 334 of the fixing member 330 is effective in preventing peeling.

Figure 31A:
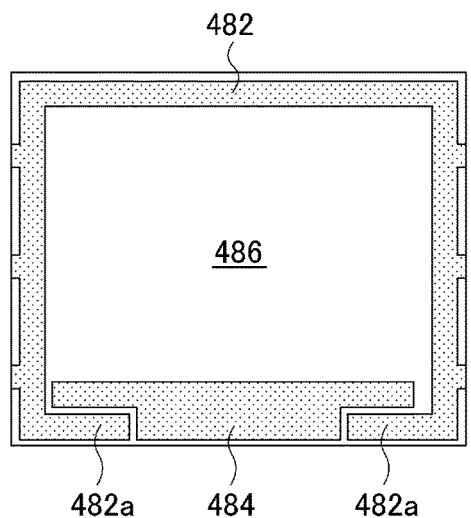
FIG. 31A is a plan view of the back surface of a planar light-emitting structure to be used in another vehicle lamp.

FIG. 31A is a schematic plan view of the back surface (i.e., surface opposite to the light-emitting surface) of another planar light-emitting structure 486 to be used in a vehicle lamp. This planar light-emitting structure 486 is fixed and supported in a lamp cabinet for a vehicle lamp by a fixing member (not illustrated), as in the planar light-emitting structure 10 described with reference to FIG. 1.

An anode feeder portion 482 electrically connected to the anode layer of the planar light-emitting structure and a cathode feeder portion 484 electrically connected to the cathode layer of the planar light-emitting structure are provided on the back surface of the planar light-emitting structure 486. A three-layer MAM consisting of Mo—Al—Mo is typically used for these feeder portions, but Mo—Ag—Mo, Cr—Al—Cr, or the like may also be used.

As in the example described with reference to FIG. 25, in FIG. 31A, the linear anode feeder portion 482 and the linear cathode feeder portion 484 are provided along the outer periphery of the back surface of the planar light-emitting structure 486. The anode feeder portion 482 has a substantially U-shape that extends along three sides of the outer periphery of the rectangular planar light-emitting structure 486 and includes two terminal portions 482a that extend into the remaining one side at the right and left ends thereof. The cathode feeder portion 484 extends along the remaining one side. Consequently, the two terminal portions 482a of the anode feeder portion 482 and the cathode feeder portion 484 are located on the lower side of the planar light-emitting structure 486.

When measured along the outer periphery of the planar light-emitting structure 486, the anode feeder portion 482 is much longer than the cathode feeder portion 484. As the anode feeder portion is longer than the cathode feeder portion in this manner, the area of the anode feeder portion is further increased, and the luminance unevenness of the planar light-emitting structure can be reduced as compared to the conventional technique.

Figure 31B:
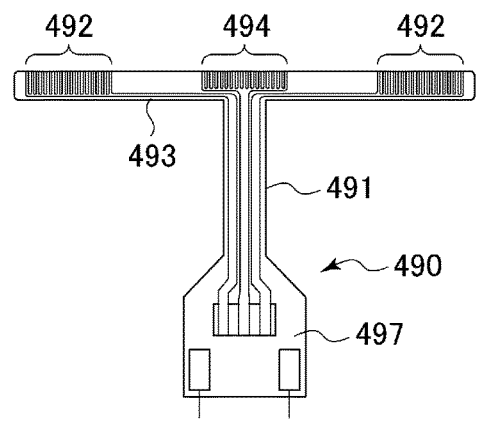
FIG. 31B is a plan view of a flexible circuit to be bonded to the planar light-emitting structure.
Figure 31C:
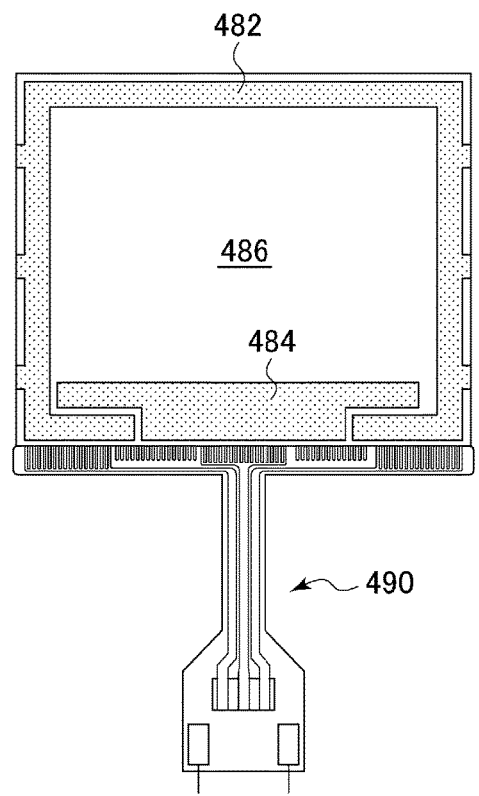
FIG. 31C illustrates a state in which the planar light-emitting structure and the flexible circuit are bonded to each other.

FIG. 31B is a schematic plan view of a flexible circuit 490 to be bonded to the planar light-emitting structure 486 illustrated in FIG. 31A. The flexible circuit 490 is substantially T-shaped and includes a linear terminal disposition portion 493 in which two anode terminals 492 electrically connected to the respective terminal portions 482a of the anode feeder portion 482 and a cathode terminal 494 electrically connected to the cathode feeder portion 484 are provided and a connection portion 491 in which a conductor formation connecting the anode terminals 492 and the cathode terminal 494 to an external power source connector 497 is formed. Anisotropic conductive adhesive films are interposed between the two terminal portions 482a of the anode feeder portion 482 and the anode terminals 492 and between the cathode feeder portion 484 and the cathode terminal 494, and thus the planar light-emitting structure 486 and the flexible circuit 490 are bonded to each other as illustrated in FIG. 31C.

Figure 32A:
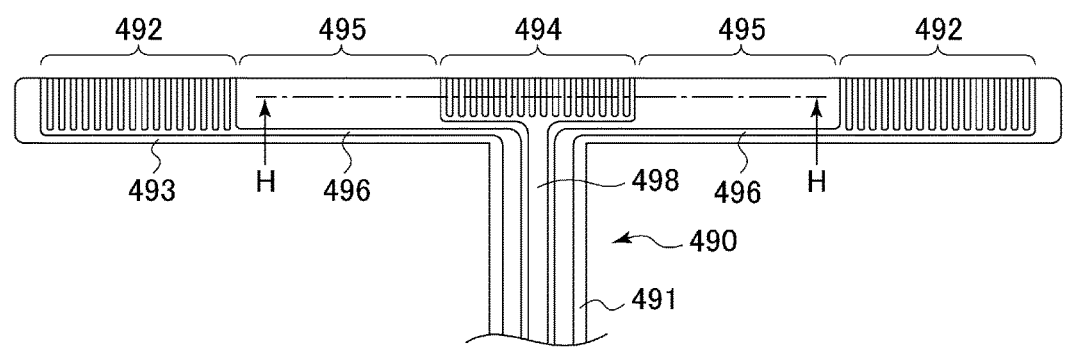
FIG. 32A is an enlarged view of the terminal disposition portion of the flexible circuit illustrated in FIG. 31B.

FIG. 32A is an enlarged view of the terminal disposition portion 493 of the flexible circuit 490 illustrated in FIG. 31B. As illustrated in FIG. 32A, the anode terminals 492 are disposed at respective ends of the terminal disposition portion 493, and the cathode terminal 494 is disposed around the intersection of the terminal disposition portion 493 and the connection portion 491. Conductor formations 496 are connected to the anode terminals 492, and a conductor formation 498 is connected to the cathode terminal 494. The conductor formations 496 and 498 extend through the terminal disposition portion 493 and the connection portion 491 of the flexible circuit 490. The anode terminals, the cathode terminal, and the conductor formations are formed as formations on the flexible circuit through a well-known method.

The anode terminals 492 are provided so as to match the positions of the terminal portions 482a of the anode feeder portion 482 that are disposed at respective ends of the lower side of the planar light-emitting structure 486. Therefore, as can be seen from FIG. 32A, a free area 495 in which no formation is constituted is present between each anode terminal 492 and the cathode terminal 494.

Figure 32B:
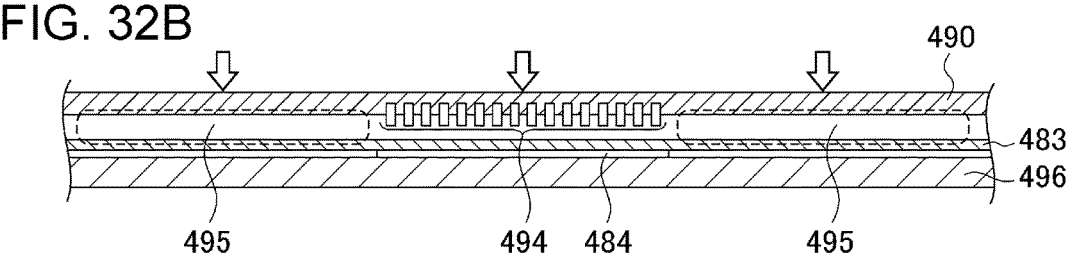
FIG. 32B is a fragmentary sectional view thereof.

FIG. 32B is a schematic sectional view taken along the line H-H indicated in FIG. 32A, and illustrates a state in which the flexible circuit 490 is affixed to the back surface of the planar light-emitting structure 486 with the anisotropic conductive adhesive film 483 interposed therebetween.

The surfaces of the anode terminals 492 and the cathode terminal 494 formed as formations on the flexible circuit 490 are higher than the surface of the free areas 495 in which no formation is constituted. Thus, if pressure is applied (e.g., by using a pressure-bonding head) in the direction indicated by the arrows in FIG. 31B when the flexible circuit 490 is affixed to the planar light-emitting structure 486, the pressure is not applied to the anisotropic conductive adhesive film 483 uniformly due to the projections of the anode terminals 492 and the cathode terminal 494. Consequently, the strength of bonding by the anisotropic conductive adhesive film is weaker in the free areas 495 than in the anode terminals 492 and the cathode terminal 494. An air space is formed between the flexible circuit 490 and the planar light-emitting structure 486 at a portion where the bonding strength is weak. Moisture can enter this air space during a high-temperature high-humidity test of a vehicle lamp or while the vehicle is running, which can cause the flexible circuit to peel off.

Figure 33:
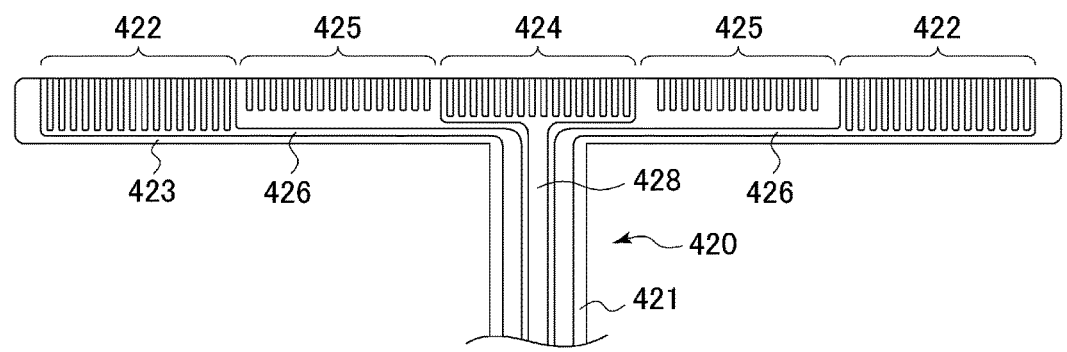
FIG. 33 is an enlarged view of a terminal disposition portion of a flexible circuit according to another example.

FIG. 33 is an enlarged view of a terminal disposition portion 423 of a flexible circuit 420 improved to prevent the peeling according to another example of the present embodiment.

As illustrated in FIG. 33, in the flexible circuit 420 according to the present example, a non-current-carrying dummy formation 425 is constituted between each anode terminal 422 and a cathode terminal 424. The dummy formations 425 are constituted as formations simultaneously when the anode terminals 422 and the cathode terminal 424 are constituted, but the dummy formations 425 are not electrically connected to conductor formations 426 and 428, and thus electricity is not passed to the dummy formations 425.

If pressure is applied to the flexible circuit 420 when the flexible circuit 420 is affixed to the back surface of the planar light-emitting structure 486 with an anisotropic conductive adhesive film interposed therebetween, the pressure can be applied uniformly on the anisotropic conductive adhesive film because of the dummy formations 425, and thus the anode terminals, the cathode terminal, and the dummy formations are bonded uniformly to the planar light-emitting structure. Therefore, an air space is less likely to be formed between the flexible circuit and the planar light-emitting structure. Consequently, a situation in which moisture enters an air space during a high-temperature high-humidity test of the vehicle lamp or while the vehicle is running is prevented, and thus the flexible circuit can be prevented from peeling off.

It is preferable that the formations be constituted continuously so that no free area is present between the dummy formations 425 and the anode terminals 422 and cathode terminal 424. The reason for this is that, if even a slight free area is present, an air space is likely to be formed at that portion. In addition, it is preferable that the dummy formations 425, the anode terminals 422, and the cathode terminal 424 have substantially the same film thickness. When there is a different in the film thickness, an air space is likely to be formed at a portion where the thickness changes. Furthermore, it is preferable that patterns of the dummy formations 425, the anode terminals 422, and the cathode terminal 424 have substantially the same pitch. This makes it possible to eliminate a variation in the bonding strength caused by a variation in pitch.

With a structure in which a planar light-emitting structure and a flexible circuit are bonded with an anisotropic conductive adhesive film such as the one described above, a breaking test needs to be carried out after bonding in order to reliably check whether feeder portions on the planar light-emitting structure and terminals on the flexible circuit are electrically connected. Therefore, a total inspection is not possible.

Figure 34A:
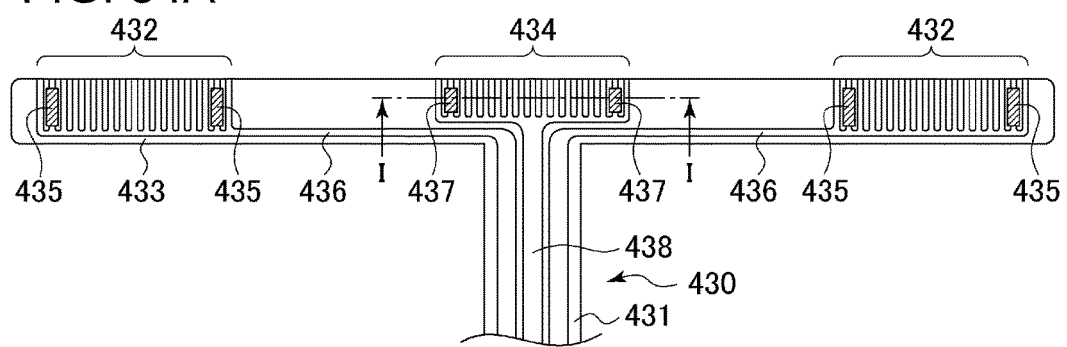
FIG. 34A is an enlarged view of a terminal disposition portion of a flexible circuit according to another example.

FIG. 34A is an enlarged view of a terminal disposition portion 433 of a flexible circuit 430 improved for an inspection according to another example of the present embodiment. As illustrated in FIG. 34A, a pair of terminals 435 for checking the connection is added to each anode terminal 432, and a pair of terminals 437 for checking the connection is added to a cathode terminal 434.

Figure 34B:
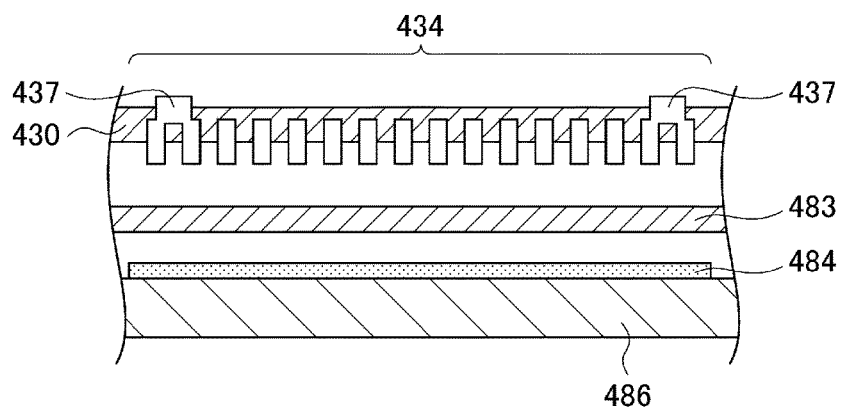
FIG. 34B is a fragmentary sectional view thereof.

FIG. 34B is a schematic sectional view taken along the line I-I indicated in FIG. 34A, and illustrates a state in which the flexible circuit 430 is affixed to the back surface of the planar light-emitting structure 486 with the anisotropic conductive adhesive film 483 interposed therebetween. As can be seen from FIG. 34, the terminals 435 and 437 for checking the connection are connected to some formations of the anode terminals 432 and the cathode terminal 434, respectively, and penetrate through the flexible circuit 430 so as to be exposed in a side opposite to the terminals. Therefore, by trying to pass the electricity through the terminals 435 and 437 for checking the connection, whether the feeder portions on the planar light-emitting structure 486 and the terminals on the flexible circuit 430 are electrically connected can be inspected with ease. In this manner, according to the present example, the planar light-emitting structure and the flexible circuit that have been bonded can be inspected nondestructively, and the inspection is simple. Thus, a total inspection can be carried out.

The examples described with reference to FIGS. 33 and 34 can be used in combination. Specifically, the dummy formation 425 illustrated in FIG. 33 may be formed between the anode terminal 432 and the cathode terminal 434 illustrated in FIG. 34.

In addition, the linear terminal disposition portions in which the anode terminals and the cathode terminals are disposed have been described in the examples described with reference to FIGS. 33 and 34, but the terminals may partially have shapes other than a straight line. For example, these examples can also be applied to an arc-shaped flexible circuit that is electrically connected to an anode feeder portion and a cathode feeder portion such as those illustrated in FIG. 29C.

Vehicle lamps in which a light-emitting diode (LED) is used as a light source is known to have a problem in that static electricity that has accumulated in an outer cover or a projection lens of a lamp can jump to the LED, causing the LED to malfunction. Thus, to date, countermeasures have been taken by, for example, grounding members, such as an extension, disposed around an LED.

It is known that such a malfunction also occurs in a vehicle lamp in which a planar light-emitting structure, such as an organic EL panel, is used as a light source when static electricity jumps to the planar light-emitting structure in a similar manner. Typically, a planar light-emitting structure is comparatively larger than an LED, and thus such countermeasures as those taken against static electricity in an LED are considered to be insufficient.

Figure 35A:
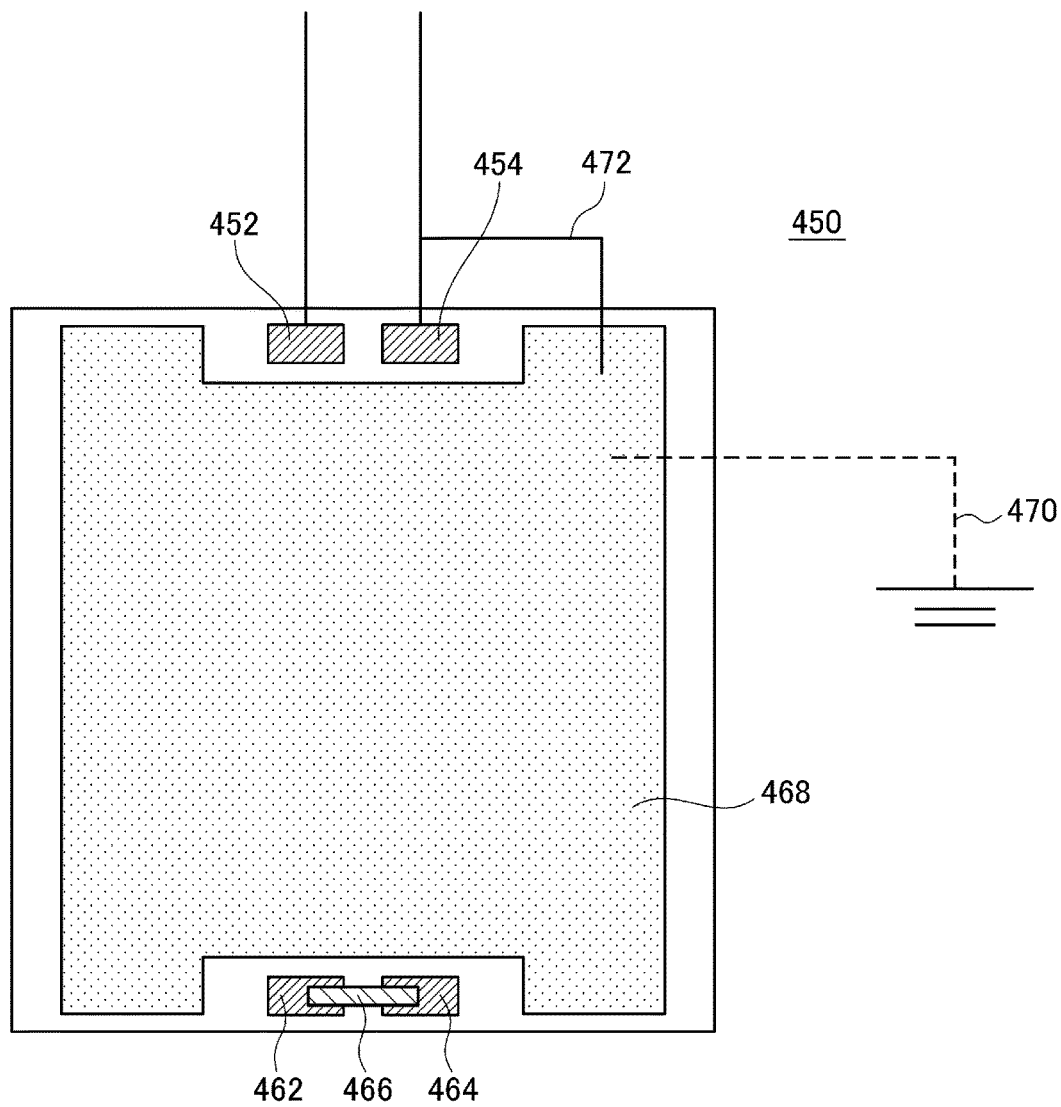
FIG. 35A is a plan view of the back side of a planar light-emitting structure according to yet another example.

FIG. 35A is a schematic plan view of the back side (i.e., surface opposite from the light-emitting surface) of a planar light-emitting structure 450 in which a countermeasure against static electricity is taken according to another example of the present embodiment.

An anode feeder portion 452 electrically connected to the anode layer of the planar light-emitting structure and a cathode feeder portion 454 electrically connected to the cathode layer of the planar light-emitting structure are provided on the back surface of the planar light-emitting structure 450. A flexible circuit (not illustrated) is bonded onto the anode feeder portion 452 and the cathode feeder portion 454 with an anisotropic conductive adhesive film interposed therebetween. Furthermore, a thin metal film 468 is provided on the back surface of the planar light-emitting structure 450 so as to cover a substantial portion thereof, and the metal film 468 is either grounded (470) or connected to a negative wire (472). With this configuration, a malfunction of the planar light-emitting structure caused by static electricity that has accumulated in a lens or the like can be prevented. The metal film 468 covers a substantial portion of the planar light-emitting structure and is thus particularly effective as a countermeasure against static electricity.

The metal film 468 also helps to improve the heat dissipation performance of the planar light-emitting structure 450. The shape or the thickness of the metal film 468 may partially be varied (e.g., the thickness is increased at a portion with higher heat radiation) so that the temperature distribution on the surface of the planar light-emitting structure 450 becomes uniform.

The metal film 468 can be formed by affixing a foil-like metal film on the rear glass substrate 22 in the configuration of the planar light-emitting structure illustrated in FIG. 1 or through metal vapor deposition. In either case, the metal film can be affixed or deposited after a flexible circuit is affixed to the feeder portions on the planar light-emitting structure. Accordingly, an increase in the fabrication cost can be suppressed.

Figure 35B:
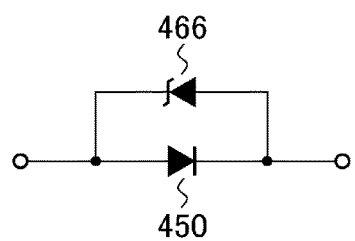
FIG. 35B is a schematic illustrating a Zener diode reverse-bias connected to the planar light-emitting structure (represented as a diode) of FIG. 35A.

Aside from the anode feeder portion 452 and the cathode feeder portion 454 to which the flexible circuit is bonded, another pair of an anode feeder portion 462 and a cathode feeder portion 464 may be provided (e.g., on a side opposite to the planar light-emitting structure), and a Zener diode 466 may be provided so as to connect these feeder portions. The Zener diode 466 is connected so as to be a reverse bias to the planar light-emitting structure 450 (see FIG. 35B). With this configuration, static electricity flows through the Zener diode 466 when a static electricity voltage of a reverse polarity is applied to the planar light-emitting structure 450, and thus a malfunction of the planar light-emitting structure 450 can be prevented.

Instead of providing a Zener diode on the back surface of the planar light-emitting structure, a Zener diode may be provided on the flexible circuit that is bonded onto the anode feeder portion 452 and the cathode feeder portion 454. With this configuration, no separate feeder portion for a Zener diode needs to be provided on the planar light-emitting structure, and thus the cost can be reduced.

One or both of the metal film 468 and the Zener diode 466 described above may be provided. In addition, these structures can also be applied to the other examples described above in a similar manner.

In the foregoing embodiments, a configuration in which the terminal portions of the anode feeder portion and the cathode feeder portion are located on the lower side of the planar light-emitting structure has been described, but such positions are not limited to be on the lower side. For example, in the case of a rectangular planar light-emitting structure such as the one illustrated in FIG. 25 or FIG. 31, the positions of the anode feeder portion 372 and the cathode feeder portion 374 may be vertically inverted, and the terminal portions 372a and 372b of the anode feeder portion 372 and the terminal portions 374a and 374b of the cathode feeder portion 374 may be located on the upper side of the planar light-emitting structure. In each of the examples illustrated in FIG. 29 as well, the positions of the anode feeder portion and the cathode feeder portion may be vertically inverted. The anode feeder portion and the cathode feeder portion may be located on a lateral side.

In the foregoing embodiments, a flexible circuit is used to supply electric power to the planar light-emitting structure. Alternatively, a substrate having an inflexible structure, such as a printed circuit, may be used.

In the foregoing embodiments, a generally flat planar light-emitting structure has been described. Alternatively, a planar light-emitting structure may be curved or bent by using, instead of a glass substrate, an ultrathin glass or a transparent resin that can accommodate to a curved surface. In this case as well, the arrangement of the anode wiring and the cathode wiring, the use of the fixing members, the convex portions provided on the base of the fixing members, and so on can be applied in a similar manner to those in the case of a flat planar light-emitting structure.

The present embodiment also includes the following configurations.

1. A vehicle lamp, comprising:
   a planar light-emitting structure having a first substrate on which an organic EL emission portion is formed, a single linear anode feeder portion and a single linear cathode feeder portion electrically connected to the organic EL emission portion being provided on a back surface along an outer periphery thereof; and
   a second substrate connected to the planar light-emitting structure so as to make contact with the anode feeder portion and the cathode feeder portion,
   the anode feeder portion being longer than the cathode feeder portion when measured along the outer periphery of the planar light-emitting structure.

2. The vehicle lamp according to 1, wherein
   the second substrate is configured to make contact with two terminal portions of the anode feeder portion located on the outer periphery of the planar light-emitting structure.

3. The vehicle lamp according to 1 or 2, wherein
   the anode feeder portion has a portion that is formed in an annular shape along the outer periphery of the planar light-emitting structure.

4. The vehicle lamp according to any one of 1 through 3, wherein
   terminal portions of the anode feeder portion and of the cathode feeder portion are provided so as to be located on one side of the planar light-emitting structure, and
   the second substrate is disposed along the one side of the planar light-emitting structure so as to make contact with all of the terminal portions.

5. The vehicle lamp according to any one of 1 through 4, further comprising:
   a fixing member that includes
   a concave portion that supports the outer periphery of the planar light-emitting structure, and
   a base that opposes the back surface of the planar light-emitting structure,
   the base having a convex portion provided at a position corresponding to a portion at which the anode feeder portion or the cathode feeder portion is connected to the second substrate.

6. The vehicle lamp according to 5, wherein
   the second substrate is connected to a lower side of the planar light-emitting structure, and
   a hole is formed in the concave portion at a portion located on the lower side.

7. The vehicle lamp according to any one of 1 through 6, wherein
   the second substrate is a flexible circuit.

8. The vehicle lamp according to any one of 1 through 7, wherein
   a current-carrying wiring formation that makes contact with the anode feeder portion or the cathode feeder portion and that passes electricity thereto and a non-current-carrying dummy formation that does not pass electricity are formed on the second substrate, and
   the current-carrying wiring formation and the non-current-carrying dummy formation have a substantially identical film thickness.

9. The vehicle lamp according to any one of 1 through 8, wherein
   a Zener diode is interposed between the anode feeder portion and the cathode feeder portion.

DESCRIPTION OF THE REFERENCE NUMERALS

10 organic EL panel (planar light-emitting structure); 12, 22 glass substrate; 30 light source unit; 32 organic EL panel; 32a feeder portion; 36 framing member; 38 elastic member; 40 rear cover; 50 light source unit; 52 conductive elastic member; 56 busbar; 60, 70 framing member; 80 organic EL panel; 90 rear cover; 100 light source unit; 112, 122 glass substrate; 130 organic EL panel; 134 projection; 134a feeder portion; 136 projection; 140, 142 bracket (fixing member); 144 elastic contact portion; 380, 390, 410 planar light-emitting structure; 318 organic EL emission layer; 330 fixing member; 332 rib; 334 base; 336 concave portion; 338 convex portion; 340 drain hole; 342 anisotropic conductive adhesive film; 350 flexible circuit; 372, 382, 392, 412 anode feeder portion; 372a, 372b terminal portion; 374, 384, 394, 414 cathode feeder portion; 374a, 374b terminal portion; 376 second anode feeder portion; 400 vehicle lamp

INDUSTRIAL APPLICABILITY

According to the present invention, stress exerted on a substrate for a planar light-emitting structure can be reduced in a vehicle lamp provided with a planar light-emitting structure.

What is claimed is:

1. A vehicle lamp, comprising:
   a planar light-emitting structure having a first substrate on which an organic electroluminescent emission element is formed, a single linear anode feeder element and a single linear cathode feeder element electrically connected to the organic electroluminescent emission element being provided on a back surface along an outer periphery thereof; and
   a second substrate connected to the planar light-emitting structure such as to be in contact with the anode feeder element and the cathode feeder element; wherein
   the anode feeder element is longer than the cathode feeder element as gauged along the outer periphery of the planar light-emitting structure,
   the second substrate is provided with an extended shape that extends along an outer periphery of the light-emitting structure, and
   the extended shape is configured to be in contact with one of terminal portions of the anode feeder element, one of terminal portions of the cathode feeder element, the other terminal portion of the cathode feeder element, and the other terminal portion of the anode feeder element in the stated order from one end of the extended shape to the other.

2. The vehicle lamp according to claim 1, wherein the anode feeder element includes a section shaped in an annular form along the outer periphery of the planar light-emitting structure.

3. The vehicle lamp according to claim 1, further comprising:
   a fixing member that includes
      a concave portion supporting the outer periphery of the planar light-emitting structure, and
      an underside opposing the back surface of the planar light-emitting structure; wherein
   the underside has a convex portion provided in a location thereon corresponding to where either the anode feeder element or the cathode feeder element is connected to the second substrate.

4. The vehicle lamp according to claim 3, wherein:
   the second substrate is connected to a lower-end side of the planar light-emitting structure; and
   a hole is formed in the concave portion in a portion thereof located on its lower-end side.

5. The vehicle lamp according to claim 1, wherein the second substrate is a flexible circuit.

6. The vehicle lamp according to claim 1, wherein:
   a current-carrying wiring formation in contact with either the anode feeder element or the cathode feeder element, and a non-current-carrying dummy formation are formed on the second substrate; and
   the wiring formation and the dummy formation are of substantially identical film thickness.

7. The vehicle lamp according to claim 1, wherein a Zener diode is interposed between the anode feeder element and the cathode feeder element.

8. The vehicle lamp according to claim 1, wherein the extended shape extends linearly.

* * * * *